US006963416B2

(12) United States Patent
Tuchitoi et al.

(10) Patent No.: US 6,963,416 B2
(45) Date of Patent: Nov. 8, 2005

(54) PRINTER, PRINTING SYSTEM, PRINT CONTROL METHOD, STORAGE MEDIUM USED TO STORE PRINT CONTROL PROGRAM FOR CONTROLLING A PRINTER, AND TRANSMISSION DEVICE FOR TRANSMITTING PRINT CONTROL PROGRAM FOR CONTROLLING A PRINTER

(75) Inventors: Naoki Tuchitoi, Kawasaki (JP); Junichi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/640,045

(22) Filed: Aug. 14, 2003

(65) Prior Publication Data

US 2004/0051898 A1 Mar. 18, 2004

Related U.S. Application Data

(62) Division of application No. 09/207,999, filed on Dec. 9, 1998, now Pat. No. 6,633,395.

(30) Foreign Application Priority Data

| Dec. 11, 1997 | (JP) | ............................................. 9-361705 |
| Feb. 19, 1998 | (JP) | ......................................... 10-034411 |
| Aug. 28, 1998 | (JP) | ......................................... 10-243430 |
| Nov. 9, 1998 | (JP) | ......................................... 10-317549 |

(51) Int. Cl.$^7$ ............................................. G06K 15/00
(52) U.S. Cl. .................................... 358/1.14; 358/1.15
(58) Field of Search .............................. 358/1.14, 1.16, 358/1.15, 1.17, 468, 1.2, 405, 435, 436

(56) References Cited

U.S. PATENT DOCUMENTS

| 5,220,674 A | * | 6/1993 | Morgan et al. ............. 709/223 |
| 5,428,747 A | * | 6/1995 | Kitamoto ........................ 710/1 |
| 5,706,412 A | * | 1/1998 | Kojo .......................... 358/1.14 |
| 5,930,551 A | * | 7/1999 | Nakazato et al. ............... 399/1 |
| 5,963,216 A | * | 10/1999 | Chiarabini et al. ......... 345/660 |
| 5,995,718 A | * | 11/1999 | Hiraike et al. ............. 358/1.11 |
| 6,025,925 A | * | 2/2000 | Davidson et al. .......... 358/1.15 |
| 6,052,204 A | | 4/2000 | Mori et al. ................. 358/296 |
| 6,058,249 A | * | 5/2000 | Matsuda et al. ........... 358/1.14 |
| 6,160,629 A | * | 12/2000 | Tang et al. .................. 358/1.1 |
| 6,301,010 B1 | * | 10/2001 | Kajita ....................... 358/1.13 |
| 6,333,789 B1 | * | 12/2001 | Shima ....................... 358/1.15 |
| 6,633,395 B1 | * | 10/2003 | Tuchitoi et al. ........... 358/1.14 |
| 6,819,443 B1 | * | 11/2004 | Shima et al. .............. 358/1.15 |
| 2002/0057714 A1 | * | 5/2002 | Takeda et al. .............. 370/468 |
| 2004/0197089 A1 | * | 10/2004 | Maeda et al. ............... 386/117 |

FOREIGN PATENT DOCUMENTS

| EP | 0 653 700 | | 5/1995 | |
| EP | EU 0653700 A | * | 5/1995 | ............. G06F/3/12 |
| JP | 411316661 A | * | 11/1999 | ............. G06F/3/12 |
| WO | 96/39656 | | 12/1996 | |

* cited by examiner

Primary Examiner—Jerome Grant, II
(74) Attorney, Agent, or Firm—Fitzpatrick, Cella, Harper & Scinto

(57) ABSTRACT

A print job can be identified without the print data of the print job being analyzed, and print data for a print job that is selected, e.g., print data stored in an input buffer, can be invalidated. In addition, the cancellation of a print job can be designated in real time. To achieve the above object, a host computer and a printer are interconnected via a communication medium. The host computer comprises job packet generation means for adding a header to print data to form a packet for each print job that is generated. The printer comprises job detection and registration means for detecting the start and end of a print job in accordance with the contents of the header of a packet received from the host computer, and for registering the print job in a database.

12 Claims, 31 Drawing Sheets

FIG. 7

| Field | Value |
|---|---|
| PRIMARY SOCKET ID | 0x10 |
| SECONDARY SOCKET ID | 0x10 |
| LENGTH | 256+6=262 |
| LENGTH | |
| CREDIT | 0x00 |
| CONTROL | 0x00 |
| DATA | DATA (256 BYTES) |

FIG. 8

| Field | Value |
|---|---|
| PRIMARY SOCKET ID | 0x20 |
| SECONDARY SOCKET ID | 0x20 |
| LENGTH | 16+6=22 |
| LENGTH | |
| CREDIT | 0x00 |
| CONTROL | 0x00 |
| DATA | DATA (16 BYTES) |

FIG. 9

| Field | Value |
|---|---|
| PRIMARY SOCKET ID | 0x00 |
| SECONDARY SOCKET ID | 0x00 |
| LENGTH (MSB) | 0x000D |
| LENGTH (LSB) | |
| CREDIT | 0x00 – 0xFF |
| CONTROL | 0x00 |
| COMMAND | 0x04 |
| PRIMARY SOCKET ID | 0x01 – 0xFF |
| SECONDARY SOCKET ID | 0x01 – 0xFF |
| CREDIT REQUESTED (MSB) | 0x0000 – 0xFFFF |
| CREDIT REQUESTED (LSB) | |
| MAX OUTSTANDING CREDIT (MSB) | 0x0000 – 0xFFFF |
| MAX OUTSTANDING CREDIT (LSB) | |

FIG. 10

| Field | Value |
|---|---|
| PRIMARY SOCKET ID | 0x00 |
| SECONDARY SOCKET ID | 0x00 |
| LENGTH (MSB) | 0x000C |
| LENGTH (LSB) | |
| CREDIT | 0x00—0xFF |
| CONTROL | 0x00 |
| COMMAND | 0x84 |
| RESULT | 0x00 |
| PRIMARY SOCKET ID | 0x01—0xFF |
| SECONDARY SOCKET ID | 0x01—0xFF |
| CREDIT (MSB) | 0x0000—0xFFFF |
| CREDIT (LSB) | |

FIG. 24

```
<ESC>%-12345X@PJL CJLMODE        ...(1)
@PJL ENTER LANGUAGE=LIPS         ...(2)
...<PDL DATA>...                 ...(3)
<ESC>%-12345X                    ...(4)
```

FIG. 25

```
<ESC>%-12345X                    ...(1)
@PJL DINQUIRE COPIES             ...(2)
1                                ...(3)
<FF>                             ...(4)
@PJL DEFAULT COPIES=3            ...(5)
```

PRINTER, PRINTING SYSTEM, PRINT CONTROL METHOD, STORAGE MEDIUM USED TO STORE PRINT CONTROL PROGRAM FOR CONTROLLING A PRINTER, AND TRANSMISSION DEVICE FOR TRANSMITTING PRINT CONTROL PROGRAM FOR CONTROLLING A PRINTER

This application is a division of application Ser. No. 09/207,999, filed Dec. 9, 1998 U.S. Pat. No. 6,633,395.

BACKGROUND OF THE INVENTION

1. Field of the Invention

The present invention relates to a printer, a printing system, a print control method and a storage medium on which is stored a print control program for controlling a printer, and more specifically to a printer that processes received print data to generate image data and to actually print the image data on a recording medium, such as a sheet of paper; a printing system that employs a predetermined communication medium to connect the above described printer and a host computer, which generates print data in accordance with instructions issued by a user; a print control method for the above described printer; a storage medium on which is stored a print control program for controlling the above described printer; and a transmission device for transmitting a control program for controlling the above described printer.

2. Related Background Art

Conventionally, a printing system that is constituted by the host computer and the printer described above is requested not only to permit the printer to print data that are generated by the host computer, but also to obtain information concerning the printer from the host computer and to set the printing environment. Many printing systems that satisfy these requests are presently being produced.

FIG. 23 is a functional block diagram illustrating the arrangement of a conventional printing system that obtains information concerning a printer from a host computer and sets the printing environment. In the conventional printing system, a host computer 2300 and a printer 2350 are interconnected by a specific communication medium 2380.

The host computer 2300 comprises an application unit 2301, a printer driver 2302, an output buffer 2303, an I/F (interface) driver 2304 and a utility unit 2305.

The application unit 2301 provides a graphic user interface for a user, and generates image data that match the purpose of the user. The printer driver 2302 translates image data generated by the application unit 2301 into page description language (hereinafter generally referred to as "PDL") data that can be printed by the printer 2350.

The output buffer 2303 is used to temporarily store the PDL data that are generated by the printer driver 2302. The I/F driver 2304 transmits to the printer 2350 the PDL data that are stored in the output buffer 2303, and exchanges various types of information with the printer 2350 to obtain information for the printer 2350 or to set the printing environment. The utility unit 2305 acquires information concerning the printer 2350 and transmits it to the graphic user interface, or changes a print job or the setup of the printer 2350 in accordance with an instruction issued by a user.

The printer 2350 comprises an I/F driver 2351, an input buffer 2352, a JCL (Job Control Language) parser 2353, a PDL translator 2354, a drawing buffer 2355, a drawing unit 2356, a printer engine 2357, and a database 2358.

The I/F driver 2351 receives PDL data from the host computer 2300, and exchanges information with the host computer to obtain information concerning the printer 2350 or to set the environment. The input buffer 2352 is used to temporally store data received by the I/F driver 2351, and serves as a buffer member for delaying the processing performed at the following stage.

The JCL parser 2353 analyzes the received data, and for assigning the processing, employs a predetermined JCL to determine whether an information acquisition request or an environment setup request for the printer 2350 has been received, or whether PDL data has been received. The PDL translator 2354 translates the PDL data that are assigned by the JCL parser 2353, and converts the PDL data into an adequate drawing object. The database 2358 is used either to store setup contents when the setting up of the environment of the printer 2350 is requested using the JCL, or is used to provide information to the JCL parser 2353 when the acquisition of information is requested in JCL. In addition, at the following stage the database 2358 transmits information to the PDL translator 2354.

Until the actual printing is initiated, the drawing buffer 2355 is used for the temporary storage of the drawing object that is generated by the PDL translator 2354. As part of the drawing process, the drawing unit 2356 changes the drawing object temporarily stored in the drawing buffer 2355 into a bitmapped image and transmits it to the printer engine 2358. After receiving the bitmapped image the printer engine 2358 prints it on a recording medium, such as paper, using a well known printing technique.

An explanation will now be given for the job control language (JCL). First, the means for transmitting a print job using JCL will be described. FIG. 24 is a listing for a print job which shows the structure used for JCL. The same text structure is used for the example in FIG. 25, which is a JCL listing comprising data generated by the printer driver 2302, and PDL data. In FIGS. 24 and 25, <ESC> indicates the escape character.

In FIG. 24, row (1) contains a UEL (Universal Exit Language) entry, indicating that the JCL parser 2353 is to begin a parsing process. Row (2) indicates that the process will be shifted to the PDL translator 2354, called "LIPS", for the translation of the PDL data and the performance of a drawing process. Row (3) indicates a plurality of lines of PDL data that are described in LIPS form. Row (4) indicates that the PDL translator 2354 will be halted and the program control shifted to the JCL parser 2353. In the above JCL listing, the printer 2350 appropriately switches a plurality of print jobs to perform printing.

An explanation will now be given for the means, using JCL, for obtaining information concerning a printing device or a print job, or for setting up the environment. In FIG. 25 is shown a list of commands and information that are exchanged in order to obtain information or to set up the environment using JCL. <ESC> indicates the escape character, and <FF> indicates the form feed character.

In row (1) in FIG. 25, as in row (4) in FIG. 24, it is indicated that the processing by the PDL translator 2354 will be halted and program control shifted to the JCL parser 2353 to initiate a parsing process. Row (2) is a command generated by the utility unit 2305 of the host computer 2300 to acquire from the printer 2350 the initial copy count (COPIES) for the pages that are to be printed by the printer 2350. The character string COPIES is used only as an example, and other information concerning the printer 2350 can be obtained using an appropriate character string. In row (3) is the reply transmitted by the printer 2350 to the host computer 2300 in response to the request in row (2). In this case, "1" is transmitted as the initial value for the count of the pages that are to be printed by the printer 2350. In row (4), a final transmission by the printer 2350 to the host computer 2300 signals the end of the reply to the request in row (2). Row (5) is a command generated by the utility unit 2305 of the host computer 2300 and indicates that the initial count value for the pages to be printed by the printer 2350 is reset to "3". With the above JCL statements, the host computer 2300 can obtain information and can set up the environment for the printer 2350.

SUMMARY OF THE INVENTION

The above described printing system has been developed over the years, and requests for obtaining information and for setting up the environment are actually more complicated. Specifically, the first function designated is a request for the cancellation of an arbitrary print job input to the printer 2350. And then, the second function requested is that the print data for the print job to be canceled be invalidated even before they have been analyzed, i.e., that print data for the print job to be canceled be invalidated even while they are still stored in the input buffer. And also, the third function requests that for the acquisition of information concerning the printer or the print job, the setup of the environment, and the designation of the print job to be canceled be performed in real time. However, a conventional printing system can not implement these three functions.

One reason that a conventional printing system can not implement the first function will now be described. As is apparent from the structure of the printer 2350, print data, including PDL data, must be translated before the JCL parser 2353 recognizes a print job. Therefore, the print data are temporarily stored in the input buffer 2352 before they are recognized by the JCL parser 2353. Thus, so long as those print data are stored in the input buffer 2352, they are not actually identified as constituting a print job, so that the printing system can not obtain complete information concerning an arbitrary print job input to the printer 2350 or the setting up of the environment, and for designating a print job to be canceled.

One reason that a conventional printing system can not implement the second function will now be described. Depending on the amount of print data provided for a print job, the processing states may vary for different parts of the print data for the print job, with one part of the data still stored in the input buffer 2352 while another part is being analyzed by the PDL translator 2354. In a conventional printing system, the print data that have not yet been analyzed by the PDL parser 2353 or the PDL translator 2354, e.g., the portion of the print data that are still stored in the input buffer, are not identified as being part of the print data for the print job.

Next, one reason that a conventional printing system can not implement the third function will now be described. Image data generated by the application unit 2301 of the host computer 2300 are converted into PDL data by the printer driver 2302, and the PDL data are transmitted via the output buffer 2303 and the I/F driver 2304 to the printer 2350. Even when information concerning the printer 2350 or the print job is to be acquired, or the environment is to be set up during the transmission of the print data, exclusive-OR control is performed by the I/F driver 2304, and a request by the utility unit 2305 can not be satisfied until the transmission of the print data is completed. Therefore, as concerns the acquisition of information related to the printer 2350 or to the print job, or the cancellation of the print job, deterioration of real time processing occurs.

To resolve these shortcomings, it is one object of the present invention to identify all the print jobs input to a printer and to designate an arbitrary print job to be canceled; to invalidate print data for a print job to be canceled even before the print data have been analyzed, for example, even when the print data are stored in an input buffer; and to cancel a print job in real time.

To achieve the above object, according to the present invention, a printer comprises:

management means for managing print job identification information that is uniquely assigned to an externally input print job for which print data are included; and print data invalidation means for, among the print data of the print job that corresponds to the print job identification information that is designated, invalidating a portion of the print data that has not yet been analyzed.

Furthermore, to achieve the above object, according to the present invention, the print data invalidation means invalidates the print data that correspond to the print job identification information that is designated and that are stored in a plurality of places, beginning with print data that is nearer to the input stage for the printer.

Further, to achieve the above object, according to the present invention, a printer further comprises:

an input buffer used to store the print data before the print data have been analyzed, and the print data invalidation means invalidates the print data that is stored in the input buffer for the print job that corresponds to the print job identification information that is designated.

In addition, to achieve the above object, according to the present invention, the input buffer is constituted by buffer blocks for the storage of the print job identification information and the print data.

Moreover, to achieve the above object, according to the present invention, the input buffer is constituted by a used buffer block queue of buffer blocks in which the print job identification information and the print data are stored, and an unused buffer block queue of unused buffer blocks. The print data invalidation means extracts, from the used buffer block queue, a buffer block in which is stored print job identification information that matches the print job identification information that is designated, and links the buffer block that is extracted to the unused buffer block queue.

Further, to achieve the above object, according to the present invention, a printer further comprises:

print data analysis means for analyzing the print data. And when the print data analysis means is analyzing the print data for the print job that corresponds to the print job identification information that is designated, the print data invalidation means halts the analyzation.

Furthermore, to achieve the above object, according to the present invention, a printer further comprises print job detection means for, without—analyzing the print data for the print job, assigning the print job identification information to the print job.

In addition, to achieve the above object, according to the present invention, the print job detection means, based on control data, analyzes a job packet that is obtained by adding, for the print job that includes print control data, the control data to the print data or to print control data, and detects the print data or the print control data for the print job.

Further, to achieve the above object, according to the present invention, the job packet consists of identification information, which is used to identify the print control data, and the print control data, or consists of the print data and identification information, which is used to identify the print data.

Moreover, to achieve the above object, according to the present invention, a printer further comprises:

print job control means for, upon receiving a print control request, controlling in accordance with a print control command the print job that is specified by the print job identification information that is designated by the print control request.

Furthermore, to achieve the above object, according to the present invention, the print control command is the acquisition or the setup of the print control data that are managed by the print job control means, or the cancellation of the print job.

Moreover, to achieve the above object, according to the present invention, when the print control command is the acquisition of the print control data, the print job control means outputs externally a print control response that includes the print control data.

Further, to achieve the above object, according to the present invention, the printer further comprises: a job channel for the input/output of the job packet and a control channel for the input/output of the print control request or the print control response.

In addition, to achieve the above object, according to the present invention, a printer further comprises logic channel control means, for generating a packet for the job channel for the input/output of the job packet, and the control channel for the input/output of the print control request or the print control response, and for employing the packet for multiplex communication using a single communication medium.

Furthermore, to achieve the above object, according to the present invention, a printer further comprises print job cancellation determination means for determining which print job is to be canceled.

Moreover, to achieve the above object, according to the present invention, the print job cancellation means determines that, of print jobs held by the printer, a print job is to be canceled for which print data are located near an output stage.

Further, to achieve the above object, according to the present invention, the printer further comprises: cancellation instruction detection means for detecting an externally received instruction for cancellation of the print job.

In addition, to achieve the above object, according to the present invention, the printer further comprises:

print job display means for displaying all the print jobs held by the printer; and print job selection means for selecting a print job to be canceled from among the print jobs displayed by the print job display means.

The same features are included for a printing system, a print control method, a storage medium on which is stored a print control program for controlling a printer, and a transmission device for transmitting a print control program for controlling the printer.

BRIEF DESCRIPTION OF THE DRAWINGS

FIG. 7 is an explanatory diagram showing a job packet, having an IEEE 1284.4 packet form, that is to be transmitted according to the first embodiment of the present invention;

FIG. 8 is an explanatory diagram showing a control packet, having an IEEE 1284.4 packet form, that is to be transmitted according to the first embodiment of the present invention;

FIG. 9 is a diagram for explaining a credit request command packet, having the IEEE 1284.4 form, according to the first embodiment of the present invention;

FIG. 10 is a diagram for explaining a reply packet for a credit request command packet, having the IEEE 1284.4 form, according to the first embodiment of the present invention;

FIG. 24 is a diagram for explaining a print data transmission method using a job control language;

FIG. 25 is a diagram for explaining the acquisition and setup of information of a printer using a job control language;

DETAILED DESCRIPTION OF THE PREFERRED EMBODIMENTS

The preferred embodiments of the present invention will now be described.

First Embodiment

Figure 1:
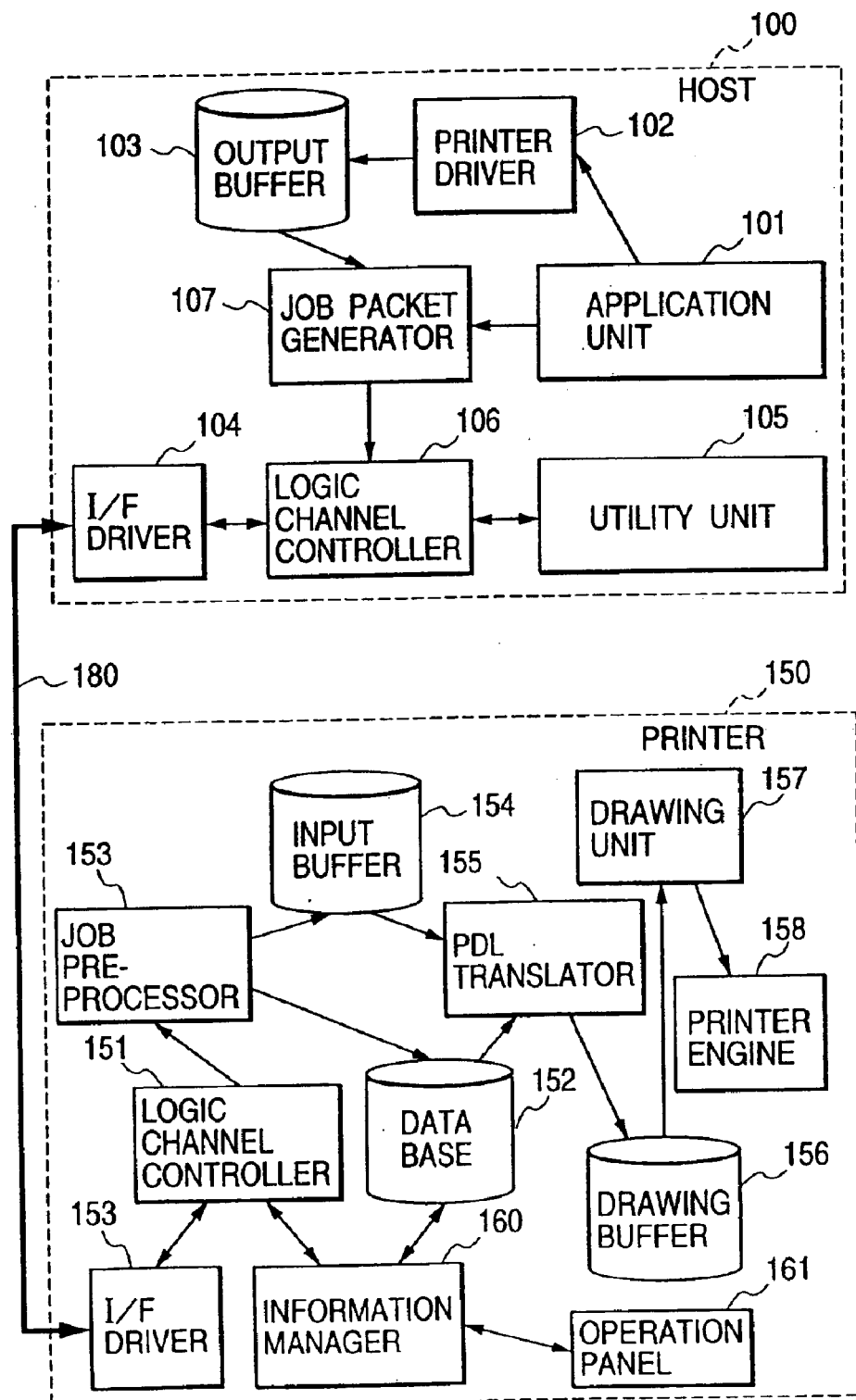
FIG. 1 is a functional block diagram illustrating the arrangement of a printing system according to a first embodiment of the present invention.

FIG. 1 is a functional block diagram illustrating the arrangement of a printing system according to a first embodiment of the present invention. In the printing system according to the first embodiment of the present invention, a host computer 100 and a printer 150 are interconnected by a predetermined communication medium 180. For the first embodiment of the present invention, a local interface that is specified by IEEE (Institute of Electrical and Electronics Engineers) 1284 is employed as the communication medium 180.

In the printing system of the first embodiment of the present invention, the host computer 100 comprises an application unit 101, a printer driver 102, an output buffer 103, an I/F driver 104, a utility unit 105, a logic channel controller 106 and a job packet generator 107.

To explain in detail the functions of the individual sections, the application unit 101 provides a graphic user interface for a user, and generates image data that matches the purpose of the user. The printer driver 102 converts the image data generated by the application unit 101 into page description language (PDL) data that can be printed by a printer 150. The output buffer 103 is used to temporarily store PDL data generated by the printer driver 102. The job packet generator 107 generates a job packet using PDL data stored in the output buffer 103.

The utility unit 105 obtains from the printer 150 a print job or information concerning the printer 150, and transmits it to the graphic user interface, or sets the print job or the information concerning the printer 150 in accordance with an instruction by the user.

The logic channel controller 106 changes, into one physical packet having the IEEE 1284.4 form, two logic channels, i.e., a job channel used for a job packet that is transmitted by the job packet generator 107 and a control channel used for a control packet that is transmitted by the utility unit 105, and transmits the physical channel to the I/F driver 104. Further, the logic channel controller 106 receives the IEEE 1284.4 logic channel packet from the printer 150 via the I/F driver 104, divides it into the two logic channels, and transmits a packet from the printer 150 to the utility unit 105. The I/F driver 104 exchanges a logic channel packet with the printer 150 via the communication medium 180.

The printer 150, which constitutes the printing system according to the first embodiment of the present invention, comprises: a logic channel controller 151, a database 152, a job pre-processor 153, an input buffer 154, a PDL translator 155, a drawing buffer 156, a drawing unit 157, a printer engine 158, an I/F driver 159, an information manager 160 and an operation panel 161.

To explain the functions of the individual sections in detail, the I/F driver 159 exchanges a logic channel packet with the host computer 100 via the communication medium 180. The logic channel controller 151 receives an IEEE 1284.4 logic channel packet from the host computer 100 via the I/F driver 159, divides it into two logic channels, a job channel and a control channel, and transmits them to the next stage. In addition, the logic controller 151 changes a reply packet from the information manager 160 into an IEEE 1284.4 packet, and transmits the logic channel packet data to the I/F driver 159. The input buffer 154 serves as a buffer member for temporarily storing the PDL data and fir delaying the processing at the succeeding stage.

The database 152 manages various types of information, such as information concerning the printer 150 or the attributes of a print job. The attributes of the print job are the name of the print job, its owner, the size and the number of copies.

In addition, information indicating the processing state of each print job is also stored. When, for example, translation of PDL data for a specific print job is begun by the PDL translator 155, the state wherein the PDL data of the print job is being analyzed by the PDL translator 155 is stored as the state of the pertinent print job. A controller, which synchronizes the individual sections so as to correctly perform a plurality of print jobs using the printer 150, updates the states of the individual print jobs. The section that has transmitted the print job to the succeeding stage or that has received the print job from the preceding stage rewrites the state of the pertinent print job.

The job pre-processor 153 receives a job packet, and employs operation code stored in the header of the job packet to transmit PDL data to the input buffer 154 or to store the attributes of a print job in the database 152. The information manager 160 stores a print job or device information in the database 152 in accordance with the operation code and data that are stored in a received control packet, or generates a reply packet in accordance with an information acquisition request from the utility unit 105 of the host computer 100, or cancels a print job in accordance with a cancellation instruction for the print job that is entered by the utility unit 105 or at the operation panel 161.

The cancellation of a print job means the same process is performed as for the withdrawal of a print job or the deletion of a print job, and also the invalidation of print data for a print job, such as PDL data and a drawing object at the printer 150.

The invalidation of print data means that the print data are to be deleted when they are stored in the input buffer or the drawing buffer, or that an invalid flag is to be set for the print data for the flag management, or that, when the print data are held by the processor, the processing for the print data is to be halted or the print data are to be abandoned.

The PDL translator 155 translates PDL data, and converts the PDL data into a drawing object that is adequate for drawing. The drawing object is temporarily stored in the drawing buffer 156 until the actual printing is initiated. The drawing unit 157 converts the drawing object that is temporarily stored in the drawing buffer 156 into a bitmapped image through the actual drawing. The printer engine 157 receives the bitmapped image from the drawing unit 157 and prints it on a sheet of paper using a well known printing technique.

Using the operation panel 161, the panel manipulation of the conventional printer is enabled, and the cancellation of a print job can be designated.

Figure 2:
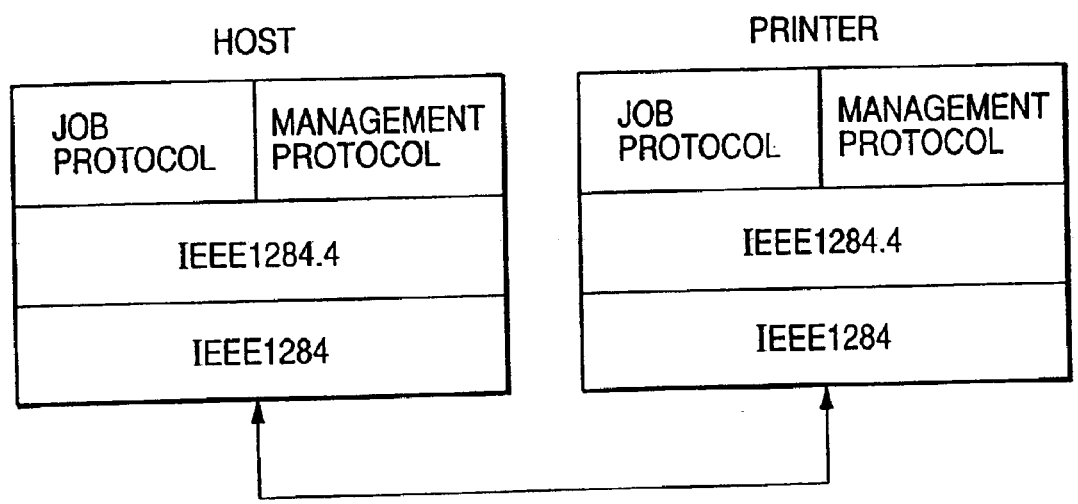
FIG. 2 is an explanatory diagram showing a reference model for the connection of a host computer and a printer in the printing system according to the first embodiment of the present invention.

FIG. 2 is an explanatory diagram showing a reference model for the connection of the host computer 100 and the printer 150 according to the first embodiment. According to the protocol that conforms to IEEE 1284, the host computer 100 and the printer 150 exchange data on a data link layer, which is a physical layer below a layer according to OSI (network protocol standards established by ISO (International Standards Organization) for the interconnection of an open-type system). In FIG. 1, this process is in charge of the I/F driver 140 of the host computer 100 and the I/F driver 159 of the printer 150.

A network layer and a transportation layer, which are the IEEE 1284 upper layers, are controlled using the logic channel protocol that is defined in IEEE 1284.4. IEEE 1284.4 defines a channel multiplex function and an accompanied control function. In FIG. 2, this process is in charge of the logic channel controller 106 of the host computer 100 and the logic channel controller 151 of the printer 150. The channels that are multiplexed according to IEEE 1284.4 are sorted into a job channel and a control channel, and various services are provided for the application layer according to the job protocol and the control protocol.

The structure of the job protocol will now be explained. The job protocol is a protocol constituted by a job packet that is generated by the job packet generator 107 of the host computer 100, and that is so specified that the job pre-processor 153 of the printer 150 can easily identify the start and the end of the print job and can set the attributes of the print job.

Figure 3:
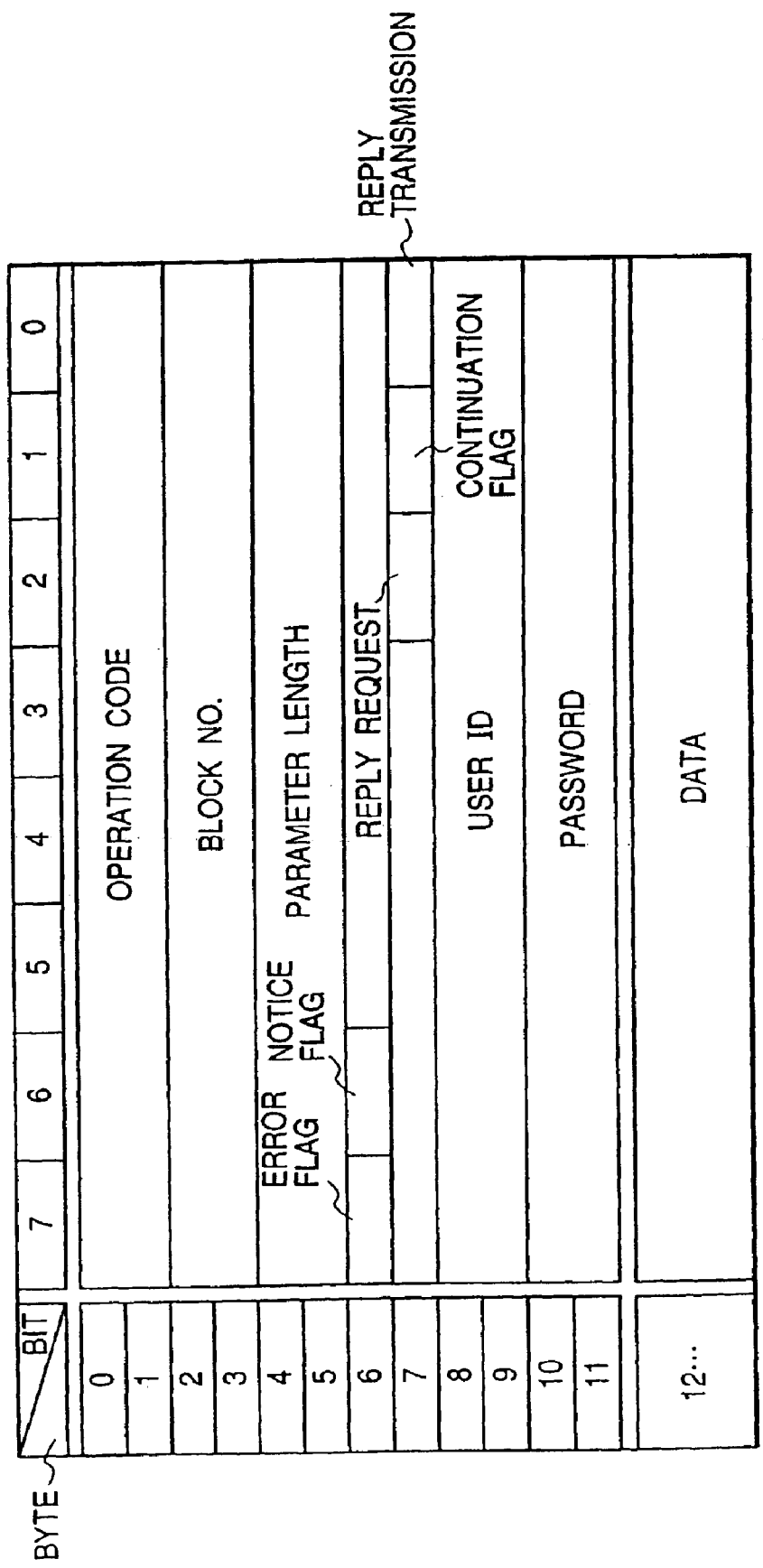
FIG. 3 is an explanatory diagram showing the structures of a job packet and a control packet according to the first embodiment of the present invention.

FIG. 3 is an explanatory diagram showing the structure of a job packet. The vertical axis represents a byte and the horizontal axis represents the bits in each byte. In FIG. 3, an operation code at bytes 0 to 1 is an ID of two bytes that indicates the function of a packet. The job packet can have the following values.

0x0201: job start operation
0x0202: job attribute setup operation
0x0204: PDL data transmission operation
0x0205: job end operation The block numbers at bytes 2 and 3 are used to acquire th contents of a reply request on the transmission side of a job packet to a reply from a reception side. For example, when a job packet having block numbers=1, 2, 3 that are sequentially transmitted and an error packet having block number=2 is returned, the transmission side can ascertain that an error has occurred in the second job packet that was transmitted.

The parameter length at bytes 4 and 5 is an area indicating the byte length of the data portion, and can indicate 0 to 64 Kbytes. Bytes 6 and 7 are areas used to indicate various flags for the job packet that represent the following contents.

Error flag: When it has a value of "1", the flag indicates the occurrence of an error in the printer 150. This flag is added to a reply packet that is transmitted from the printer 150 to the host computer 100.

Notice flag: When it has a value of "1", the flag notifies the host computer 1 that there is no reply to a request packet from the host computer 100, and is a matter to be reported by the printer 150.

Continuation flag: When it has a value of "1", the flag indicates that since all data are not included in the data portion, the remaining data are to be transmitted with the succeeding packet. The same operation code as the preceding packet must be set for the next job packet.

Reply request: A value of "1" is set when the host computer 100 requests a reply packet from the printer 150. When it has a value of "0", there is no reply when the packet is correctly processed. When an error occurs at the printer 150, a reply packet having an error flag set to "1" is constantly transmitted, even though the reply request is 0/1.

A user ID at bytes 8 and 9 and a password at bytes 10 and 11 are areas used for the authentication of a packet that is transmitted in order to limit the manipulations available when using the packet for security reasons. These areas do not affect this embodiment.

Data that correspond to operation code are stored in byte 12 and the following bytes. Data are not present in this byte when the operation code is for a job start operation or a job end operation.

For the job attribute setup operation, a desired job attribute ID and a job attribute value are stored in the data portion. The job attribute ID is an identifier that is provided in accordance with the attribute or the environment for a job, and an ID that corresponds to the attribute of a job that is defined by ISO-10175 (DPA) is assigned for the identifier in advance. The typical job attribute IDs are as follows.

Job attribute ID
0x0101: job name
0x0103: job owner name
0x016a: job size

In addition, depending on the function of the printer 150, the other job attributes, such as the number of copies and monochrome/color, and a corresponding ID can be assigned for the identifier.

For PDL data transmission operation, PDL data are entered in the data portion. The maximum data that can be designated with the above parameter length, i.e., data of 64 Kbytes, can be stored in one job packet, and data larger than that is divided into a plurality of job packets for transmission. In this case the continuation flag is set to "1".

Figure 4:
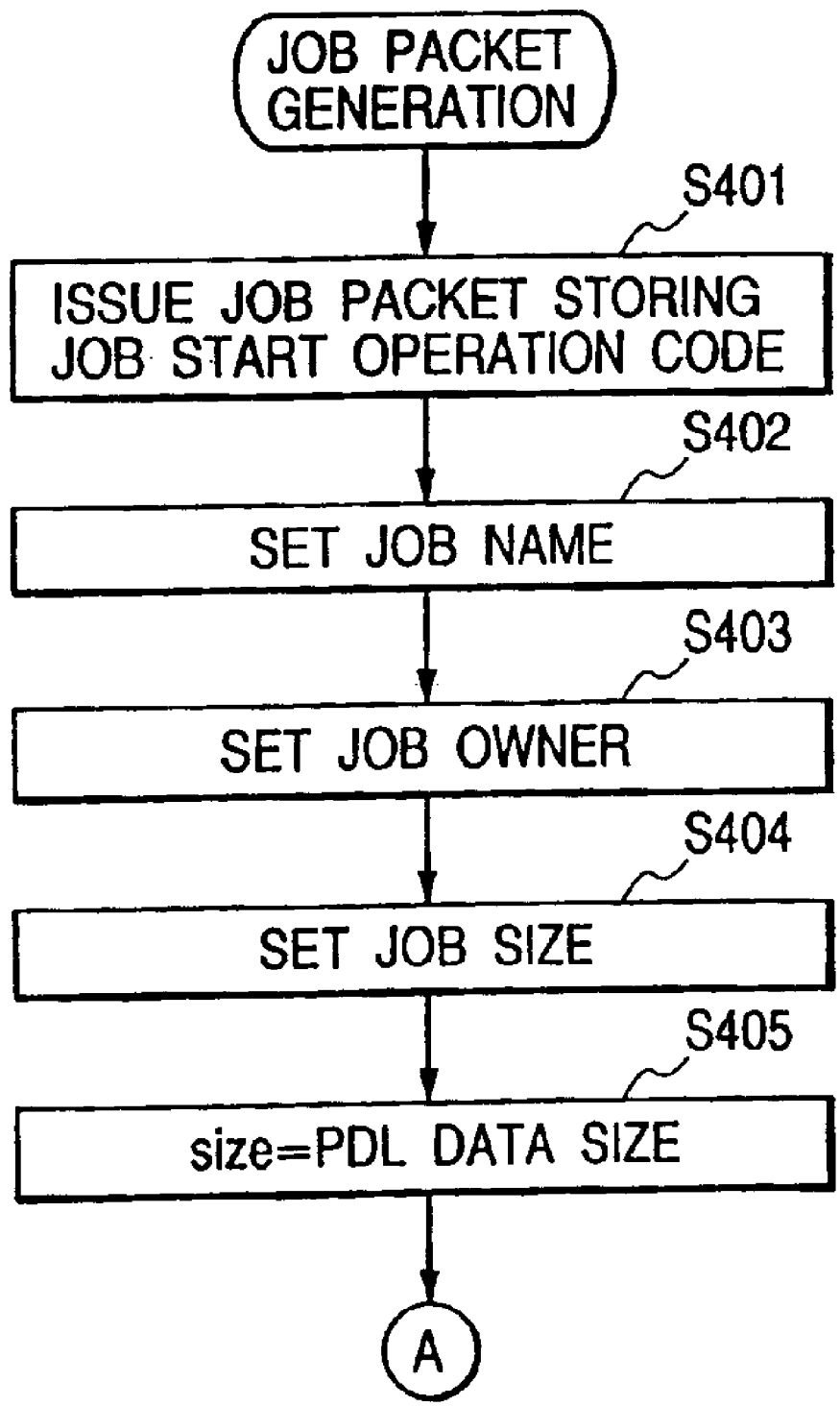
FIG. 4 is a flowchart showing the processing performed by a job packet generator in the host computer according to the first embodiment of the present invention.
Figure 5:
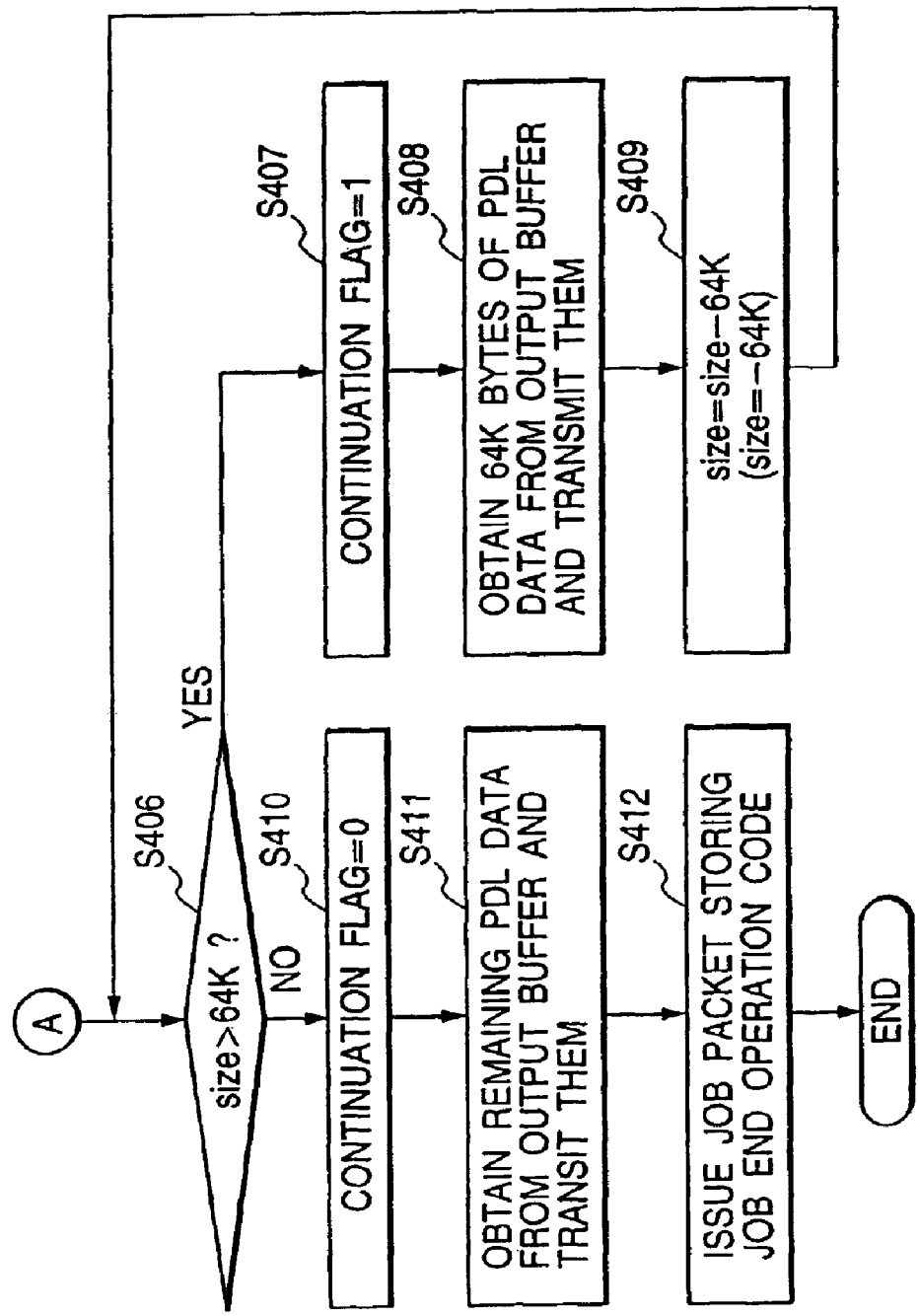
FIG. 5 is a flowchart showing the processing performed by the job packet generator in the host computer according to the first embodiment of the present invention.

The job packet generator 107 of the host computer 100 will now be explained. FIGS. 4 and 5 are flowcharts showing the processing performed by the job packet generator 107. When the printing is selected by the application unit 101, the printer driver 102 is activated to generate and transmit PDL data to the output buffer 103. Then, the job packet generator 107 begins the processing.

At step S401, a job packet, wherein the job start operation code (0x0201) is stored in an area for storing the operation code in FIG. 3, is issued to the logic channel controller 106. Thereafter, all the operations are performed to set the attributes of the pertinent print job until a job packet in which the job end operation code is stored is issued.

At step S402, the name of a job is set. The job attribute setup operation code (0x0202) is stored in the area of a job packet used for storing the operation code in FIG. 3, and the job attribute ID (=0x0101), which indicates the name of a print job, and a name, which serves as a job attribute value (e.g., "Document 1" in this case), are stored in the data portion. This job packet is issued to the logic channel controller 106.

At step S403, the owner of the print job is set. The job attribute setup operation code (0x0202) is stored in the area of a job packet used for storing the operation code in FIG. 3, and the job attribute ID (=0x0103), which indicates the job owner, and the name of the owner, which serves as the job attribute value (e.g., "Taro" in this case), are stored in the data portion. This job packet is issued to the local channel controller 106.

At step S404 the size of the print job is set. The job attribute setup operation code (0x0202) is stored in the area of a job packet used for storing the operation code in FIG. 3, and the job attribute ID (=0x016a), which indicates the job size, and the data size of the job, which serves as the job attribute value (e.g., "100000" in this case), are stored in the data portion. This job packet is issued to the local channel controller 106.

At step S405 the size of the PDL data to be transmitted is substituted into the variable "size". At step S406 the size of variable "size" is examined to determine whether it is larger than 64 Kbytes. Since the parameter length at the packet header is expressed using 16 bits, the size of the data portion of the job packet is limited to a maximum of 64 Kbytes, and data larger than that is divided into a plurality of job packets for transmission.

If the size of the PDL data is larger than 64 Kbytes, at step S407 the continuation flag in the packet header in FIG. 3 is set to "1". At step S408 64 Kbytes of PDL data are extracted from the output buffer 103. The PDL data transmission operation code (0x0204) is stored in the area of a job packet used for storing the operation code in FIG. 3, and the extracted PDL data are stored in the data portion. The resultant job packet is issued to the logic channel controller 106. At step S409 the 64 Kbytes of data that are transmitted are subtracted from the variable "size", and program control returns to the branch at step S406.

When, at step S406, the size of the remaining PDL data is equal to or smaller than 64 Kbytes, only one job packet need to be transmitted to complete the transmission of the PDL data that are concerned with the print job. In this case, at step S410 the continuation flag in the packet header in FIG. 3 is set to "0" to indicate the termination of the transmission of PDL data for the print job.

At step S411 the remaining PDL data are extracted from the output buffer 103. The PDL data transmission operation code (0x0204) is stored in the area of a job packet used for storing the operation code in FIG. 3, and the remaining PDL data that are extracted are stored in the data portion. The resultant job packet is then issued to the logic channel controller 106.

At step S412 the job end operation code (0x0205) is stored in the area of a job packet used for storing the operation code in FIG. 3, and this job packet is issued to the logic channel controller 106. The processing is thereafter terminated.

An explanation will now be given for the job pre-processor 153 of the printer 150. When the job pre-processor 153 receives from the job packet generator 107 the job packet in which is stored the job start operation code (0x0201), the job pre-processor 153 recognizes the start of the print job, and issues an object ID to the print job and registers it in the database 152.

As a result, the print job that is received by the printer 150 can be identified, without the PDL data of the print job being analyzed. In addition, since the print job is managed by issuing the object ID, all the print jobs input to the printer 150 can be identified. Further, a print job for which the attributes are to be obtained or are to be set, or a print job that is to be canceled, can be designated by employing the object ID.

Until a job packet is received in which the job end operation code (0x0205) is stored, the attributes of the pertinent print job are stored in the database 152, or the PDL data of the print job are transmitted to the input buffer 154 in accordance with the operation code of a received job packet.

Figure 31:
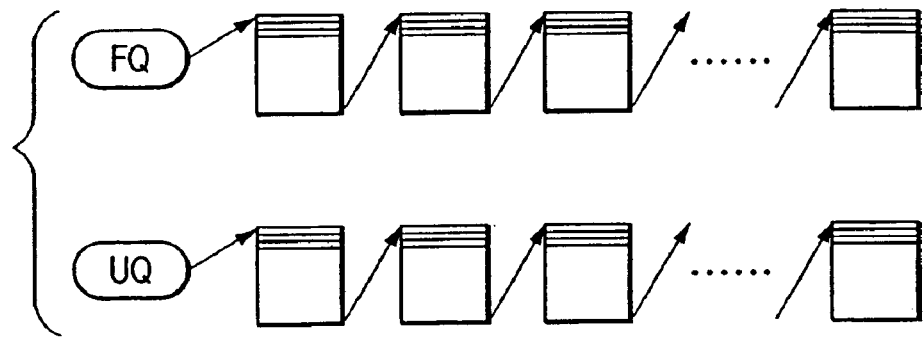
FIG. 31 is a diagram for explaining the structure of an input buffer.

The structure of the input buffer 154 will now be described while referring to FIGS. 31 and 32. As is shown in FIG. 31, the input buffer 154 consists of used queue UQ and free queue FQ, which will be described later. Each queue is managed by connecting a plurality of buffer blocks in FIG. 32. As is described above, the input buffer 154 has a buffer block form, and is constituted by a plurality of buffer blocks that have headers.

Figure 32:
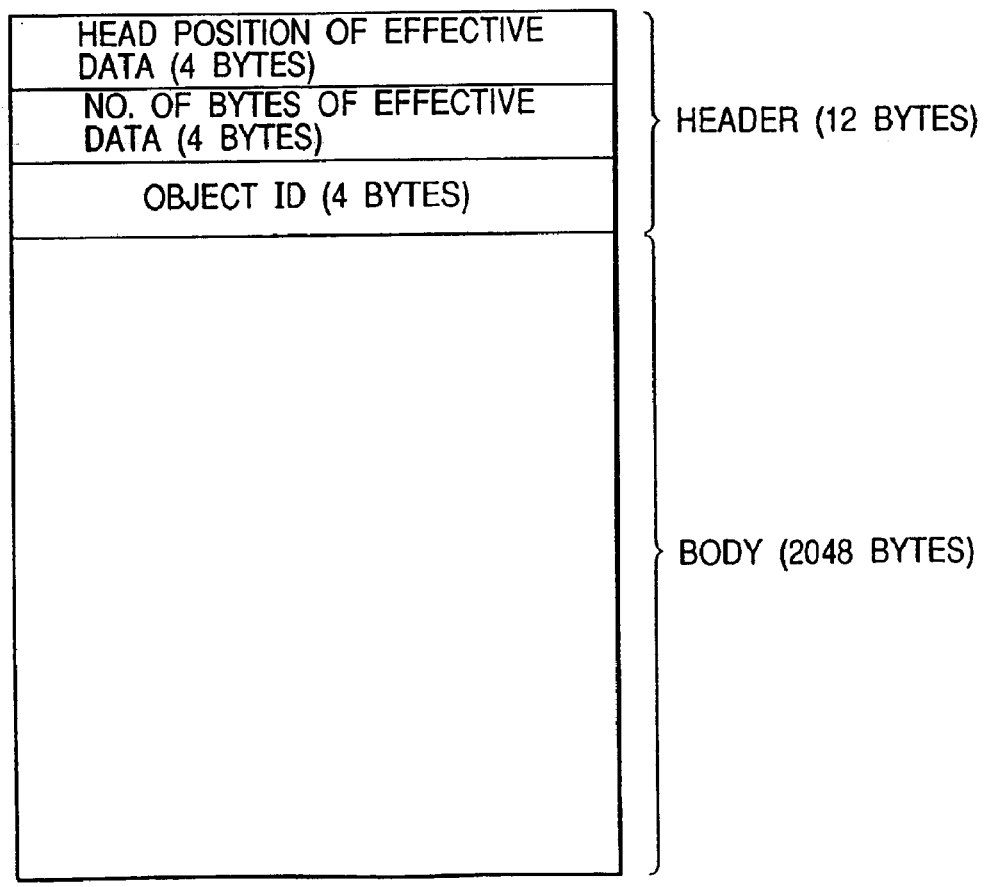
FIG. 32 is a diagram for explaining the structure of a buffer block.

As is shown in FIG. 32, the buffer block consists of a header (12 bytes) and a body (2048 bytes). The header includes three areas, each of four bytes, in which are stored in order the head position of the effective data, the number of bytes of effective data, and an object ID.

The head position of the effective data is the head position of the effective portion of data stored in the body of the buffer block. When the head position of the effective data is, for example, 0, it means that the effective data begin at the head position of the body. When the head position is 2047, it means that only the first byte of the body is effective data. The head position of the effective data is incremented by one each time the PDL translator 155 reads one byte of the PDL data from the body of the buffer block.

The number of bytes of effective data is the size of the data stored in the body of the buffer block. A byte size of 2048 bytes is prepared as the body of the buffer block, but the body need not be completely filled with data. When there are, for example, 100 bytes of PDL data, they are stored in the body of a specific buffer block, and the number of bytes of the effective data stored in the buffer block is set at 100. When there are 2100 bytes of PDL data, 2048 PDL data bytes can be stored in the body of the first buffer block, and the remaining 52 bytes can be stored in the body of the second buffer block.

The number of bytes of effective data is decremented by one each time the PDL translator 155 reads one byte of data.

While one or more buffer blocks may be employed, normally, several to several tens of buffer blocks are employed because the reception speed is low when there are too few buffer blocks. In this embodiment, 10 buffer blocks are employed. That is, the input buffer 154 consists of ten buffer blocks and has a total capacity of 20480 bytes.

These buffer blocks are managed by an FIFO (First In First Out) queue. In this embodiment, there are two types of FIFO queues: a used queue UQ and a free queue FQ.

The buffer blocks that are transmitted by the host computer 100 and in which are stored PDL data that have not yet been translated by the PDL translator 156 are linked together in used queue UQ in the order in which the PDL data was received. Also, empty buffer blocks wherein PDL data are not stored in the body are linked together in free queue FQ.

When the printer 150 is activated, all ten buffer blocks are linked together in the free queue FQ, and there are no buffer blocks in the used queue UQ. When a print job is transmitted by the host computer 100, a buffer block is extracted from the free queue FQ. The PDL data for the print job are stored in the body of the buffer block, which is then added as a link to the used queue UQ. This process is repeated so long as print jobs continue to be transmitted by the host computer 100.

The input buffer 154 is managed by using buffer blocks, and only the PDL data for one print job can be stored in one buffer block. Further, the header is provided for an individual buffer block, and when storing the PDL data for a print job in a buffer block, the object ID of the print job is stored in the head of the buffer block.

Figure 33:
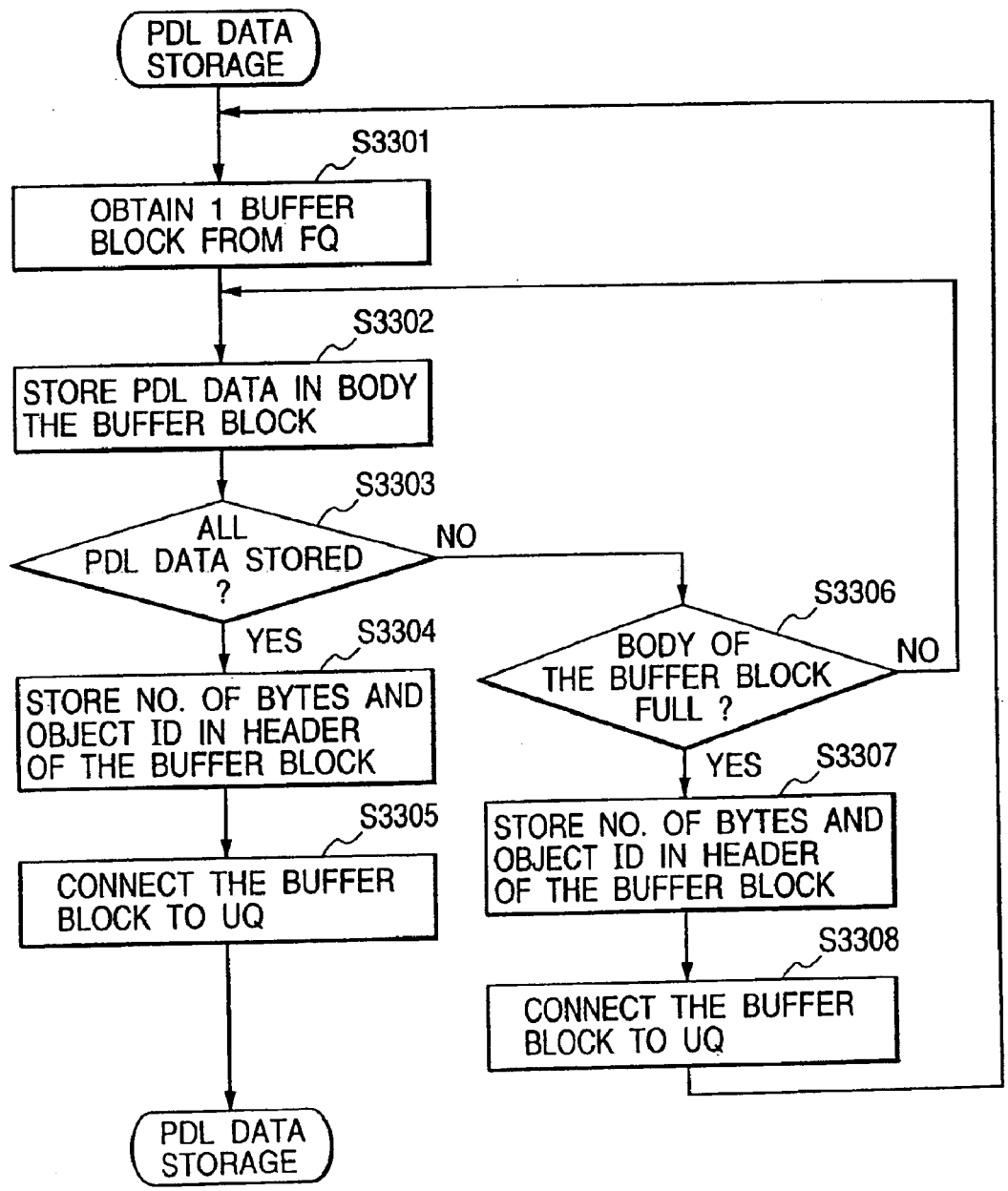
FIG. 33 is a flowchart showing the processing performed by the job pre-processor to store PDL data for a print job in the input buffer.

A specific explanation will now be described for the processing performed from the time the job pre-processor 153 receives a print job until it stores the PDL data for the print job in the input buffer 154. FIG. 33 is a flowchart showing the processing performed by the job pre-processor 153 from the time it receives a print job until it stores the PDL data for the print job in the input buffer 154.

First, when the job pre-processor receives a print job, at step S3301 one buffer block is extracted from free queue FQ. At step S3302 as much as possible of the PDL data for the print job are stored in the body of the buffer block.

At step S3303 a check is performed to determine whether all the PDL data for of the print job are stored in the input buffer 154. When all the PDL data have been stored, at step S3304 the number of the last byte of the PDL data that has been stored and the object ID of the print job are entered in the header of the buffer block. At step S3305 the buffer block is linked into the used queue UQ. Processing is thereafter terminated.

When, at step S3303, all the PDL data of the print job are not stored in the input buffer 154, at step S3306 a check is performed to determine whether the body of the buffer block is full. When the buffer block is not full, program control returns to step S3302 and the remaining PDL data for the print job are stored in the body of the buffer block.

When the buffer block is full, at step S3308, as at step S3304 the number of bytes of PDL data that are stored in the body of the buffer block, and the object ID of the print job are entered in the header of the buffer block. At step S3308 the buffer block is linked into the used queue UQ. Program control returns to step S3301, and the remaining PDL data for the print job are stored in a new buffer block.

In this manner, each time the job pre-processor 153 receives PDL data for a print job, the PDL data are stored in the input buffer 154.

When the PDL translator 155 recognizes that there are buffer blocks present in used queue UQ, it extracts the buffer blocks one by one from used queue UQ, translates the PDL data stored therein, and converts them into image data.

After the PDL translator 155 has converted all the PDL data stored in a buffer block into image data and, the body of the buffer block is empty, the buffer block is connected to free queue FQ.

So long as there are buffer blocks remaining in used queue UQ, the PDL translator 155 repeats the above processing.

Figure 34:
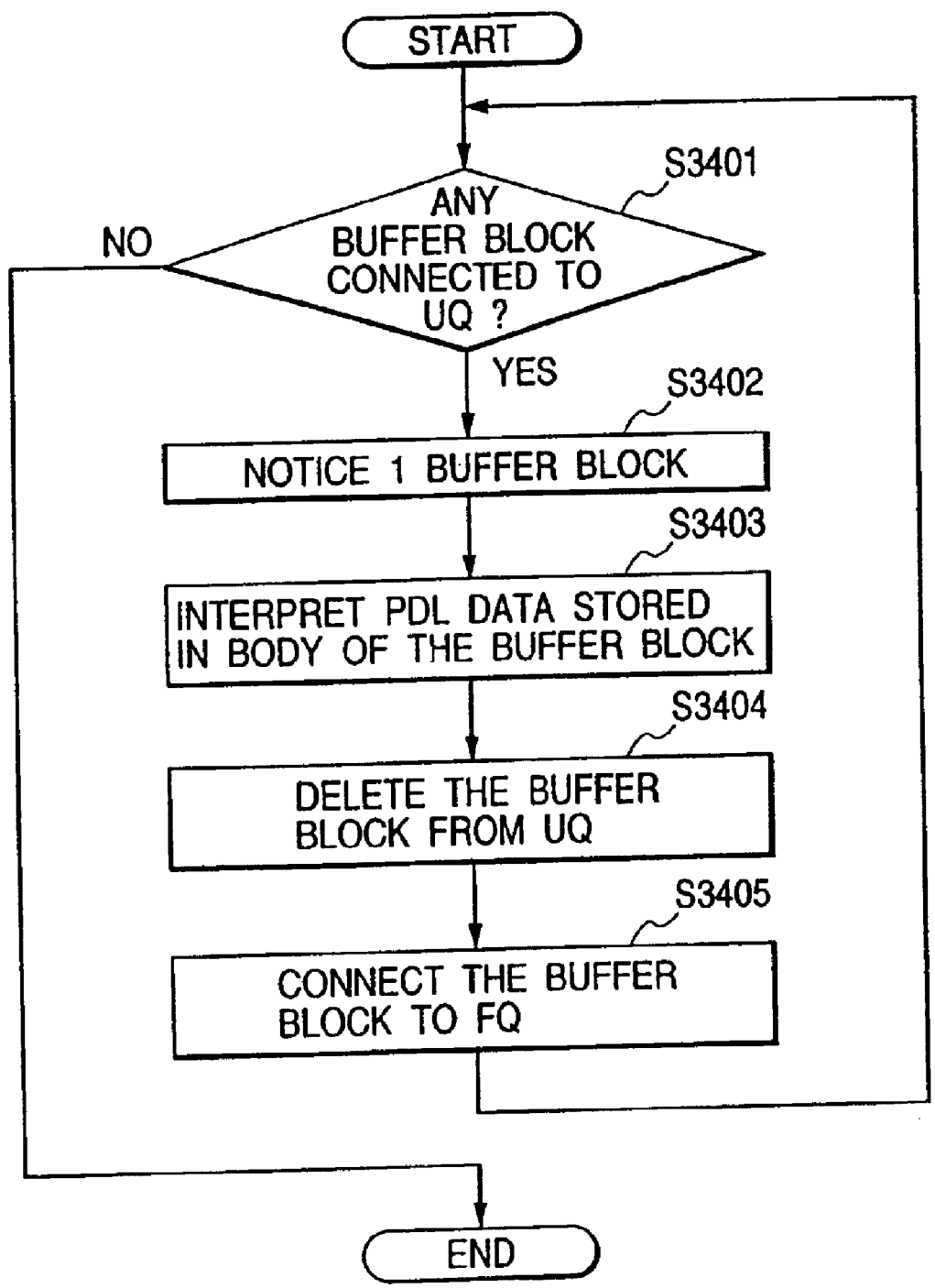
FIG. 34 is a flowchart showing the processing performed by a PDL translator to translate PDL data stored in the input buffer and to generate a drawing object.

A specific explanation will now be given for the processing performed by the PDL translator 155. FIG. 34 is a flowchart showing the processing performed by the PDL translator 155 when translating PDL data stored in an input buffer 154 and generating a drawing object.

First, at step S3401 a check is performed to determine whether there are buffer blocks present in used queue UQ. If there are no buffer blocks in used queue UQ, the processing is terminated.

When there are buffer blocks in used queue UQ, at step S3403, PDL data stored in the body of a buffer block that is positioned at the head of used queue UQ are translated and converted into a drawing object. Then, the obtained image object is transmitted to the drawing buffer 156.

At step S3404, that buffer block is deleted from used queue UQ, and at step S3405 the buffer block is connected to free queue FQ.

The logic channel controller 106 of the host computer 100 will now be described. The logic channel controller 106 processes the above described OSI network layer and transportation layer. The logic channel controller 106 assigns a job packet issued by the job packet generator 107 and a control packet issued by the utility unit 105 to a job channel and a control channel, respectively, to form a logic channel packet, and transmits the logic channel packet to the I/F driver 104 at the succeeding stage. In addition, the logic channel controller 106 receives the logic channel packet from the printer 150 via the I/F driver 104 and divides it into two logic channels, and transmits a reply packet from the printer 150 to the utility unit 105.

The logic channel packet will now be explained. The logic channel packet is data that consist of a stream of packets defined by IEEE 1284.4. The logic channel packet is transmitted as a single set of data via the communication medium (interface) 180, and is logically analyzed to prepare a plurality of channels by the logic channel controller 106 of the host computer 100 and the logic channel controller 151 of the printer 150. Then, a job packet or a control packet is transmitted to the succeeding stage.

Figure 6:
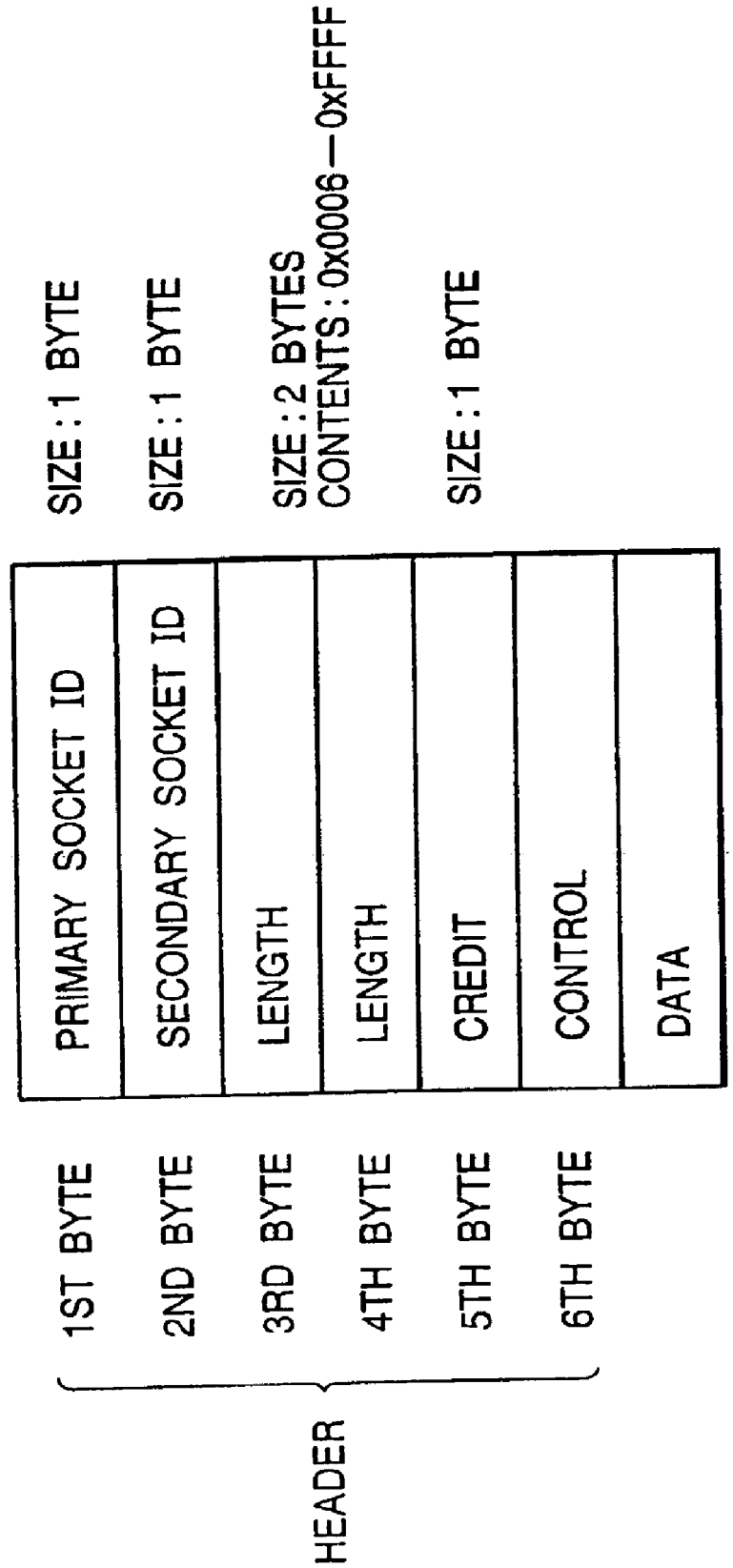
FIG. 6 is an explanatory diagram showing the structure of an IEEE 1284.4 packet according to the first embodiment of present invention.

The IEEE 1284.4 packet structure will now be described. FIG. 6 is a conceptual diagram for explaining the IEEE 1284.4 packet structure. The IEEE 1284.4 packet has a header of six bytes: the first two bytes are used for a socket ID, the next two bytes for data length, one byte for a credit area, one byte for a control area, and finally 64 Kbytes (including the header length) for the largest data portion. The credit area is a necessary concept for the flow control, which will be described later. The socket ID of the job channel is defined as 0x10, both for the transmission side and the reception side, and the socket ID of the control channel is defined as 0x20,both for the transmission side and the reception side.

An explanation will now be given for the logic channel packet when a job packet of 256 bytes are transmitted by the job packet generator 107. FIG. 7 is a conceptual diagram for explaining the structure of a logic channel packet into which the above described job packet is changed. The primary socket ID=0x10 and the secondary socket ID 0x10 are designated in order to change into a logic channel packet a job packet that is transmitted by the job packet generator 107 of the host computer 100 to the job pre-processor 153 of the printer 150.

The size of the logic channel packet, including the header, is designated as the data length. Since in FIG. 7 the data size is 256 bytes and the header size is 6 bytes, the total data length is 262 bytes. Though not particularly necessary, 0x00 is stored in the credit and the control areas. FIG. 8 is a concept diagram of the changing of a control packet having a data length of 16 bytes into a logic channel packet.

The concept of the credit area will now be described. The credit area is used for flow control. If data received from a specific device must be temporarily stored in the resources available in the credit area (generally a buffer that constitutes readable/writable storage means, which is referred to as an input buffer, while assuming the presence of the printer in this invention), the amount of data to be received must be controlled so that it does not exceed the capacity of the input buffer, for otherwise, the storage of the received data may fail and the processing will not be performed correctly. To prevent such a problem, a flow control process for adjusting the halting and resumption of data transmission is performed.

The credit is issued by the packet reception side to the transmission side for each channel, and indicates how many packets the reception side can receive. The packet reception side guarantees that it can receive the packets that are issued as credits. When there is no credit, it means that the reception side can not receive data across for the pertinent channel. A credit request command packet and a reply packet are employed to exchange the credit. When the host computer 100 has used all the credits for the job channel and can not transmit a logic channel packet, the host computer 100 transmits a credit request command packet to the printer 150.

FIG. 9 is a conceptual diagram for explaining a credit request command packet. The credit request command packet consists of 13 bytes, and 0x00 is designated for the primary socket ID and the secondary socket ID, and 0x04 is set for a command. Since the socket ID=0x00 is a special channel used only for commands, this can not be used for the exchange of real data. In FIG. 9, the socket ID for requesting the credit is designated at bytes 8 and 9, while the number of necessary credits is designated at bytes 10 and 11. When the printer 150 receives the credit request command packet, it generates a reply packet in accordance with the state of the input buffer 154, and transmits the reply packet to the host computer 100.

FIG. 10 is a conceptual diagram for explaining a reply packet. The reply packet consists of 12 bytes, and 0x00 is set in the primary socket ID and the secondary socket ID, while 0x84 is set for the command. In FIG. 10, when credit can be issued, 0x00 is set as the result (byte 8), and the size of credit that can be issued is set in bytes 11 and 12.

The processing performed by the logic channel controller will now be described. Since the logic channel controller 106 of the host computer 100 and the logic channel controller 151 of the printer 150 have the same internal structure, the following explanation will be given for both logic channel controllers 106 and 151.

Figure 11:
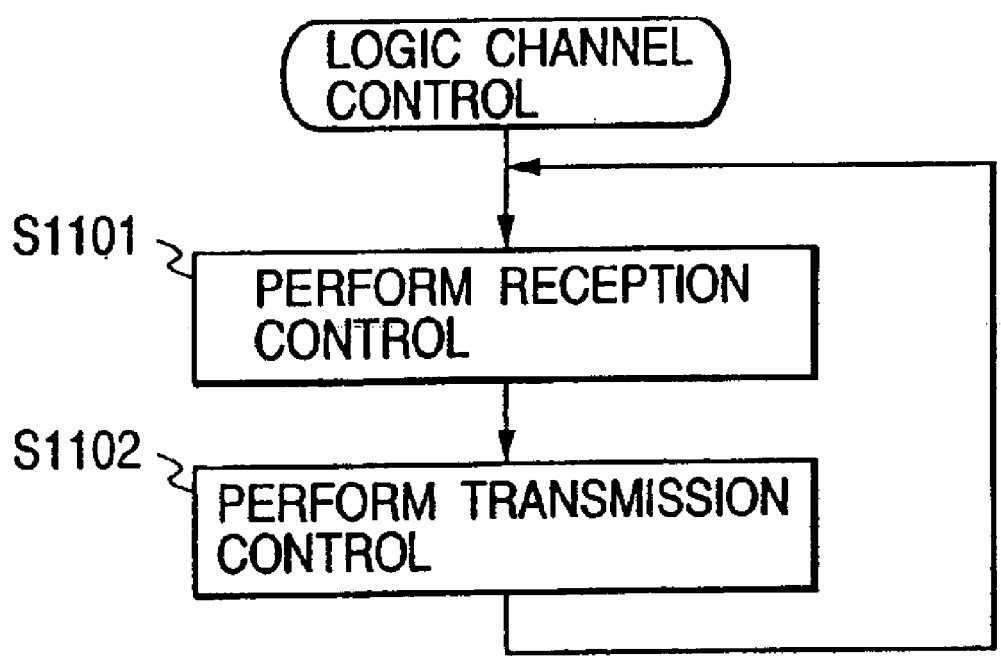
FIG. 11 is a flowchart showing the processing performed by a logic channel controller according to the first embodiment of the present invention.

FIG. 11 is a flowchart showing the processing performed by the logic channel controller. At step S1101 the reception control process is performed and at step S1102 the transmission control process is performed. The processing for the logic channel controller consists of an endless loop that includes steps S1101 and S1102.

Figure 12:
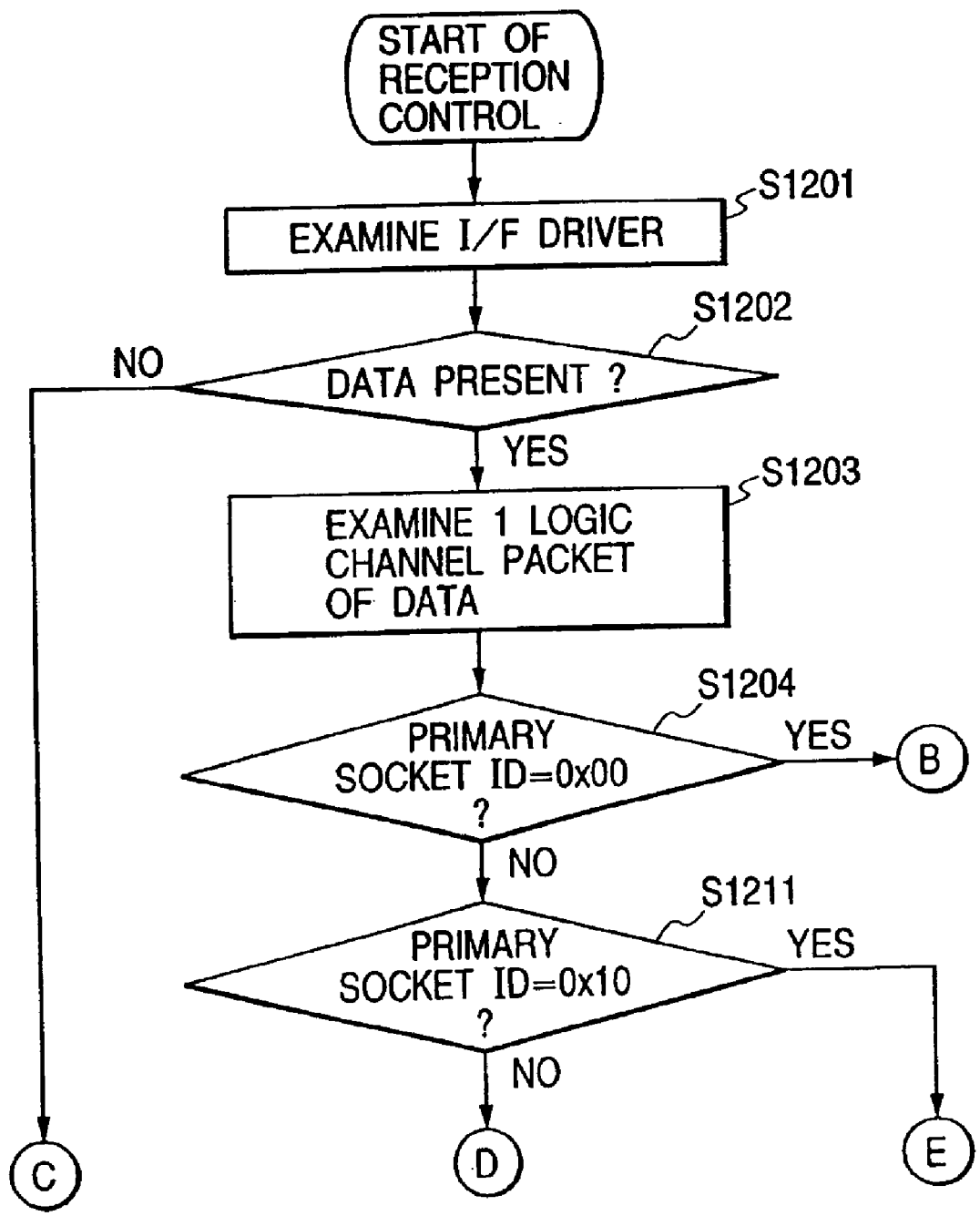
FIG. 12 is a detailed flowchart showing the reception control processing performed by the logic channel controller according to the first embodiment of the present invention.
Figure 13:
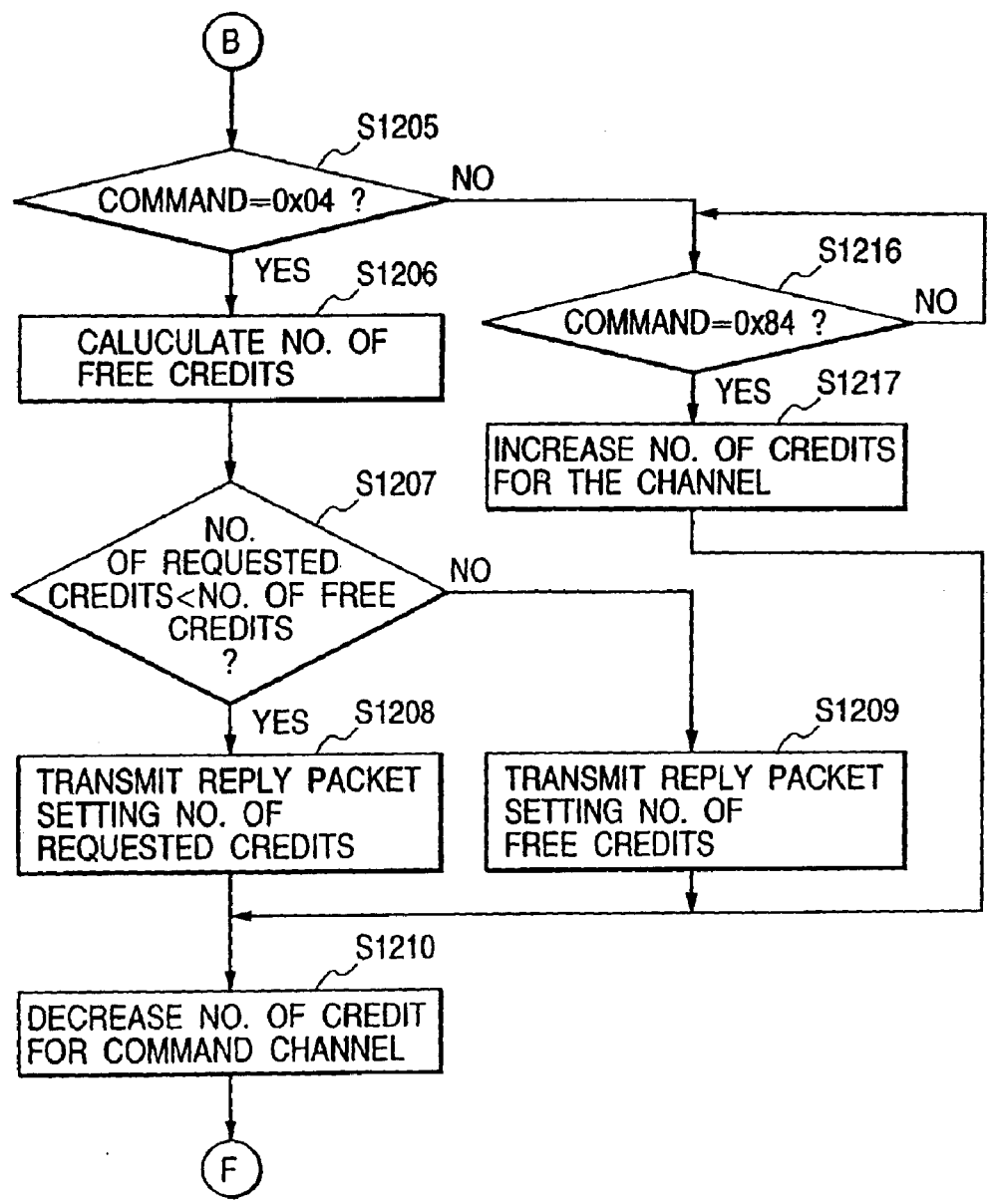
FIG. 13 is a detailed flowchart showing the reception control processing performed by the logic channel controller according to the first embodiment of the present invention.
Figure 14:
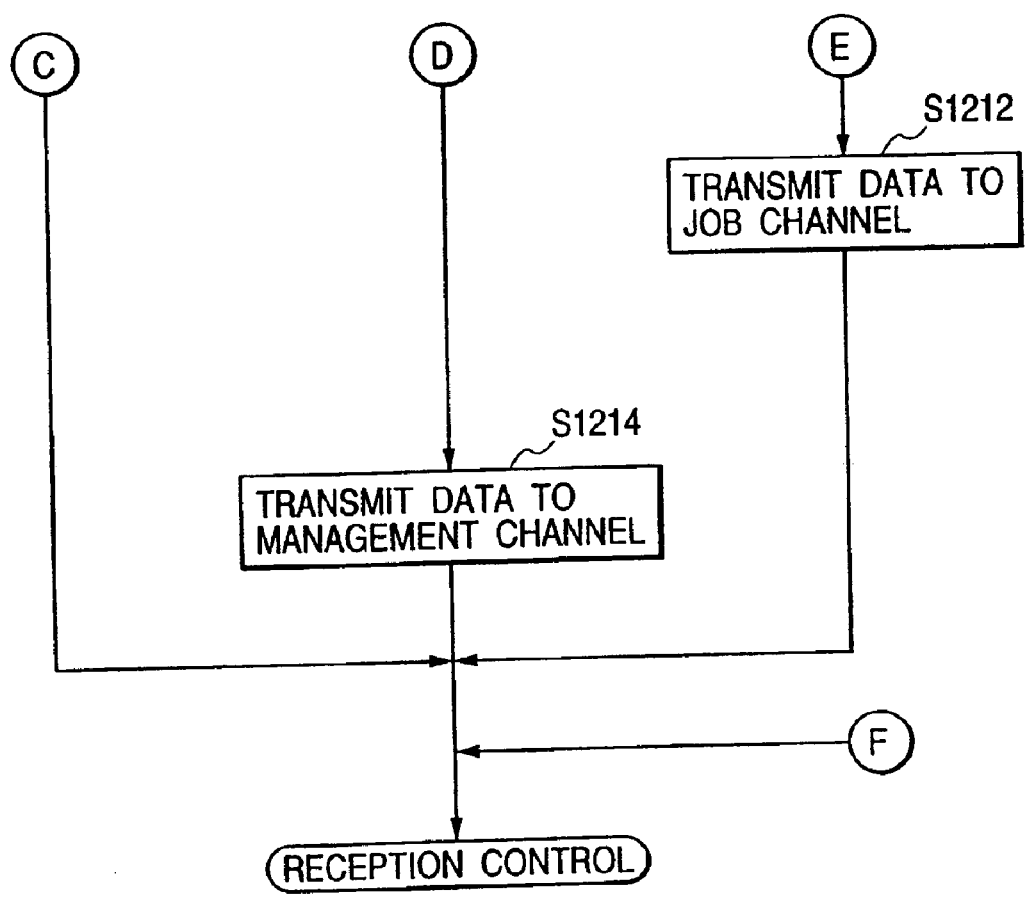
FIG. 14 is a detailed flowchart showing the reception control processing performed by the logic channel controller according to the first embodiment of the present invention.

FIGS. 12 to 14 are detailed flowcharts showing the reception process (steps S1101 in FIG. 11) performed by the logic channel controller. At step S1201 the I/F driver is examined, and at step S1202 a check is performed to determine whether data are present. When data are present, at step S1203 data for one logic channel packet are examined. For the primary socket ID 0x00, program control branches to step S1205, for the primary socket ID 0x10 program control branches to step S1212, and for the other primary socket ID, program control branches to step S1214.

When the primary socket is 0x00 and program control branches to step S1205, it is assumed that a command channel is defined by IEEE 1284.4. When the command ID for the command channel is 0x04, it is assumed that the packet is a credit request command packet, and program control advances to step S1206.

At step S1206 a channel for which credit is requested is specified by examining the primary socket ID and the secondary socket ID that are entered at bytes 8 and 9 in the credit request command packet, and the number of free credits is calculated from the capacity of a free input buffer for the pertinent channel. Since for a command channel (ID=0x00) the size of one credit is supposed to be 64 bytes, according to the IEEE 1284.4, when there are 256 bytes free in the command channel, four credits can be provided.

At step S1207 the number of credits that are requested in the credit request command packet is compared with the number of free credits obtained at step S1206. When the number of free credits is larger, at step S1208 a reply packet is generated and is issued to the I/F driver 104 or 159 in which the same number is entered as the number of the requested credits.

When at step S1207 the number of free credits is smaller than the number that is requested, at step S1209 a reply packet in which the number of all the free credits is entered is generated and is issued to the I/F driver 104 or 159. If no free credit is available, the number of credits is set to "0".

When at step S1216 the command ID of the command channel is 0x84, it is assumed that the packet is a reply packet for the credit request command. In this case, at step S1217 the credit for a channel that corresponds to the socket ID indicated at bytes 9 and 10 of the reply packet shown in FIG. 10 is incremented by a number equivalent to the size indicated at bytes 11 and 12.

When the primary socket ID is 0x10 and program control branches to step S1212, in this embodiment it is assumed that this packet is for a job channel. The header of the logic channel packet is deleted and the data added to the packet are transmitted to the job channel. The data are those in the above described job packet. At this time, for the logic channel controller 151 of the printer 150, since the job channel is connected to the job pre-processor 153, hereinafter the job-preprocessor 153 will translate the job packet. On the other hand, the logic channel controller 106 of the host computer 100 does not require the performance of the process for receiving the job channel.

When the primary socket ID is neither 0x00 nor 0x10, and program control branches to step S1214, it is assumed that the packet is for a control channel (primary socket ID=0x20). The header of the logic channel packet is deleted, and the data added to the packet are transmitted to the control channel. The data are those in the above described control packet. At this time, for the logic channel controller 151 of the printer 150, since the control channel is connected to the information manager 160, hereinafter the control packet will be translated by the information manager 160. On the other hand, for the logic channel controller 106 of the host computer 100, since the control channel is connected to the utility unit 105, hereinafter the control packet is translated by the utility unit 105.

Figure 15:
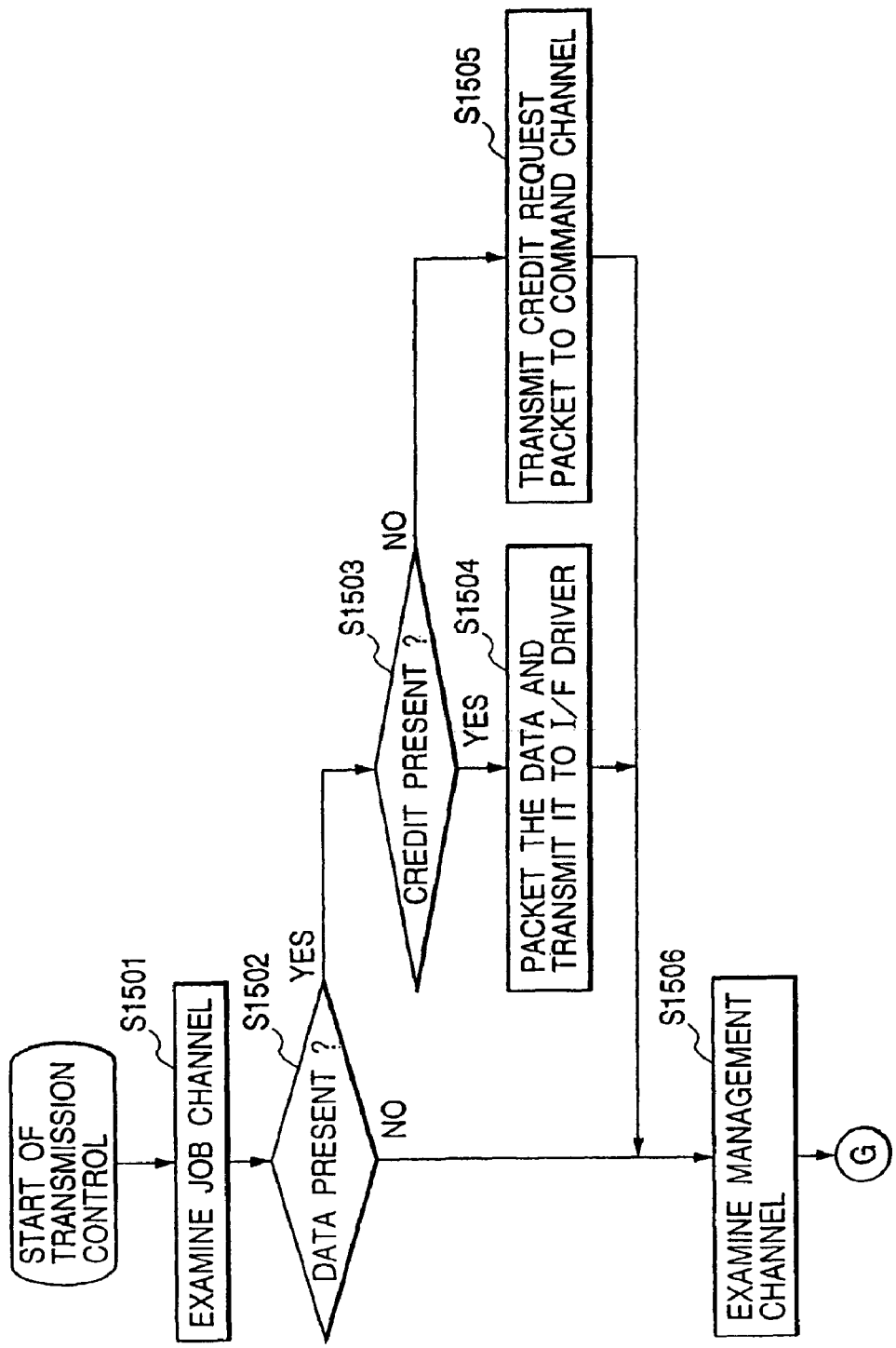
FIG. 15 is a detailed flowchart showing the reception control processing performed by the logic channel controller according to the first embodiment of the present invention.
Figure 16:
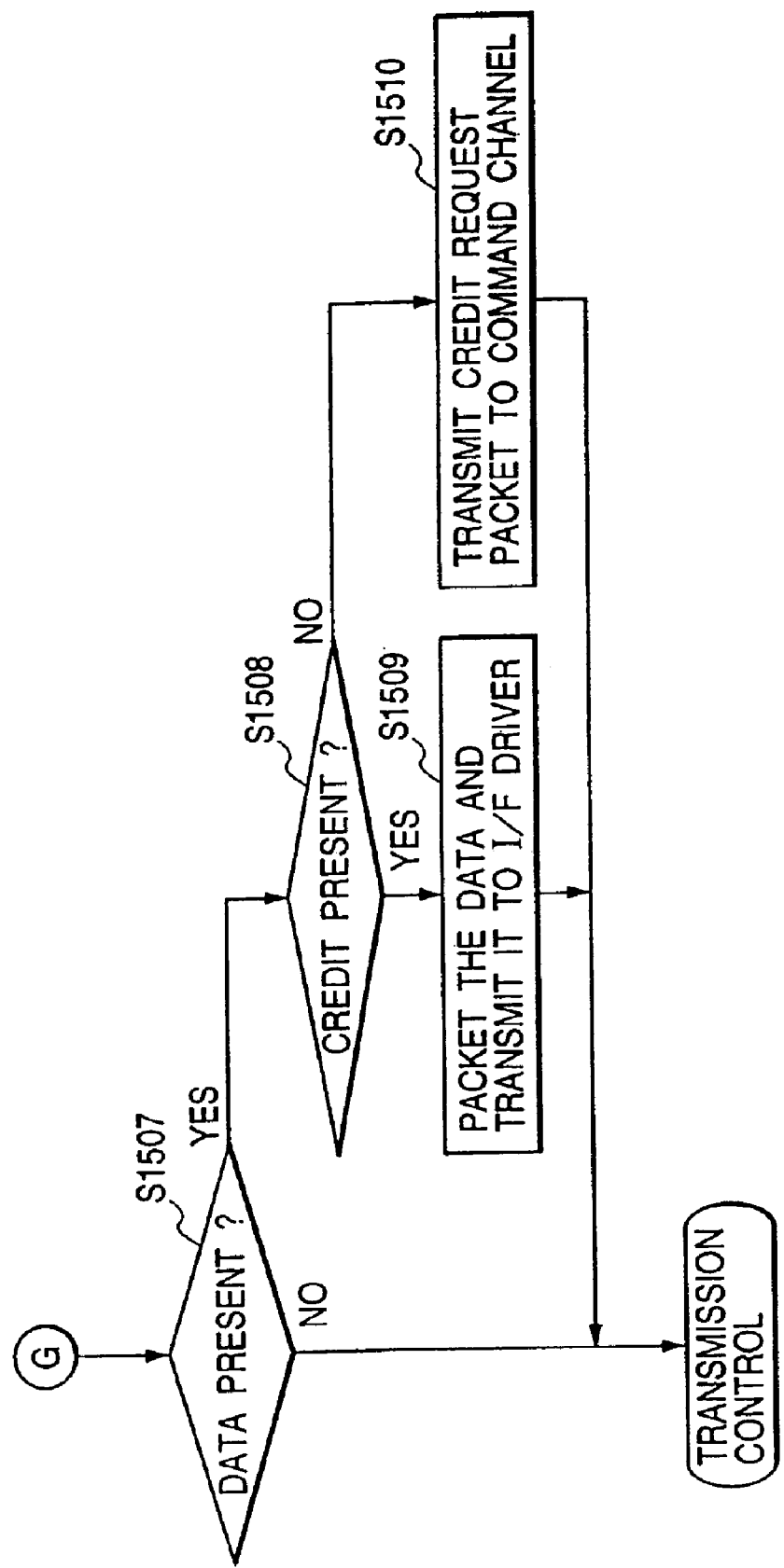
FIG. 16 is a detailed flowchart showing the reception control processing performed by the logic channel controller according to the first embodiment of the present invention.

FIGS. 15 and 16 are detailed flowcharts showing the transmission control process (step S1102 in FIG. 11) performed by the logic channel controller. First, at step S1501 a job channel is examined. For the logic channel controller 106 of the host computer 100, the job channel is connected to the job packet generator 107, while for the logic channel controller 151 of the printer 150, no job channel is connected.

At step S1502 a check is performed to determine whether data are present for the job channel. If data are present for the job channel, at step S1503 a check is performed to determine whether there is a credit available for the transmission of a job to the printer 150. If a credit is available, at step S1504 the header of the IEEE 1284.4 packet is added to the data to form a packet, which thereafter is transmitted to the I/F driver 104 at the succeeding stage. And the number of credits available for the job packets used for transmission is reduced. When no credit is available, at step S1505 a credit request command packet is transmitted to the command channel to obtain a credit. At this time, the number of credits available for command packets is decremented.

At step S1506 the control channel is examined. For the logic channel controller 106 of the host computer 100, the control channel is connected to the utility unit 105 while for the logic channel controller 151 of the printer 150 the job channel is connected to the information manager 160.

At step S1507 a check is performed to determine whether data are present for a control channel. When data are present, at step S1508 a check is performed to determine whether there is a credit available for the control channel for a job to the printer 150. If a credit is available, at step S1509 the header for the IEEE 1284.4 packet is added to the data to form a packet, which thereafter is transmitted to the I/F driver 104 at the succeeding stage, and the number of credits available for the control channel is reduced. When no credit is available, at step S1510 a credit request command packet is transmitted to the command channel to obtain a credit. At this time the number of credits available for the command packet is decremented.

As is described above, since the two logic channels, the job channel and the control channel, are provided for the communication medium, even when a print job that includes PDL data is being transmitted by the host computer 100 to the printer 150, the acquisition or the setup of information for the print job of the printer 150, or the cancellation of a print job, can be requested by the utility unit 105 of the host computer 100.

The utility unit 105 of the host computer 100 will now be described. The utility unit 105 is used to display the list and the attributes of print jobs for a user, and to enable the user to instruct the setup of information for a print job and the cancellation of a print job. The utility unit 105 uses the control channel to exchange with the printer 150 a control packet in order to obtain or to set up a print job and device information concerning the printer 150, or to instruct the cancellation of a print job.

The control packet, as well as the job packet, has the data structure shown in FIG. 3. The information entered into byte 0 to byte 11 of the packet header are also the same as those for the job packet, with the exception that the operation code differs from the job packet as follows.

0x010b: instruction for cancellation of print job
  0x101d: acquisition of list of print jobs
  0x0105: setup of attributes
  0x0106: acquisition of attributes
  0x0110: instruction for halting of printer
  0x0111: instruction for recovery of printer
  0x011a: instruction for resetting of printer Unlike job packets, control packets are used for their individual unique purposes.

In order to understand print jobs that are stored in the printer 150, the utility unit 105 of the host computer 100 transmits to the control channel a control packet wherein is stored the operation code (0x010d) for acquisition of the list of print jobs. The class ID (0x0102) indicating the print job class is entered in the data portion. The control packet is changed to an IEEE 1284.4 logic channel packet by the logic channel controller 106, and the obtained packet is transmitted via the I/F driver 104 to the printer 150.

The logic channel packet is received by the I/F driver 159 of the printer 150, the header of the logic channel packet is deleted by the logic channel controller 151, and the obtained control packet is transmitted to the information manager 160.

The information manager 160 examines the operation code entered in the received control packet and determines that the acquisition of the print job list is requested. The list information for the print jobs stored in the database 152 is obtained, and a reply packet is transmitted.

The reply packet, as well as the job packet, has the data structure shown in FIG. 3. The same operation code as that for the received control packet, i.e., the operation code for the acquisition of the print job list, is stored in the operation code area of the reply packet. The number of print jobs that are identified by the printer 150 and the list of object IDs for the print jobs are stored in the data portion.

When included with each print job is information for the job name, for the owner and for the size as the result of the job attribute setup operation, the utility unit 105 can obtain detailed information concerning the print job. When the utility unit 105 obtains the list of print jobs, it transmits to the printer 150 a control packet in which is stored operation code (=0x0106) in order to acquire detailed attributes. The object ID of a print job, for which the detailed attributes are desired, and the attribute ID to be obtained are stored in the data portion of the control packet. When, for example, the name of the first print job is to be obtained, "1" is entered as the object ID and 0x0101 is entered as the attribute ID. In accordance with the operation code for the received control packet, the information manager 160 determines that the acquisition of attributes is requested. The information manager 160 then acquires, from the database 152, the value of the attribute ID that is designated for the print job, and transmits a reply packet.

To cancel an arbitrary print job in the printer 150, the utility unit 105 transmits to the printer 150 a control packet in which is stored the operation code (=0x010b) for instructing to cancellation of a print job. In accordance with the operation code for the received control packet, the information manager 160 determines that the cancellation of a print job is requested. When print data for the print job for which cancellation is requested is stored in either the job pre-processor 153, the input buffer 154, the PDL translator 155, the drawing buffer 156 or the drawing unit 157, the information manager 160 cancels the pertinent print job. When the print job is canceled, the information manager 160 transmits a reply packet indicating that the print job was normally canceled. It should be noted that the object ID of a print job to be canceled is stored in the data portion of the control packet.

Figure 17:
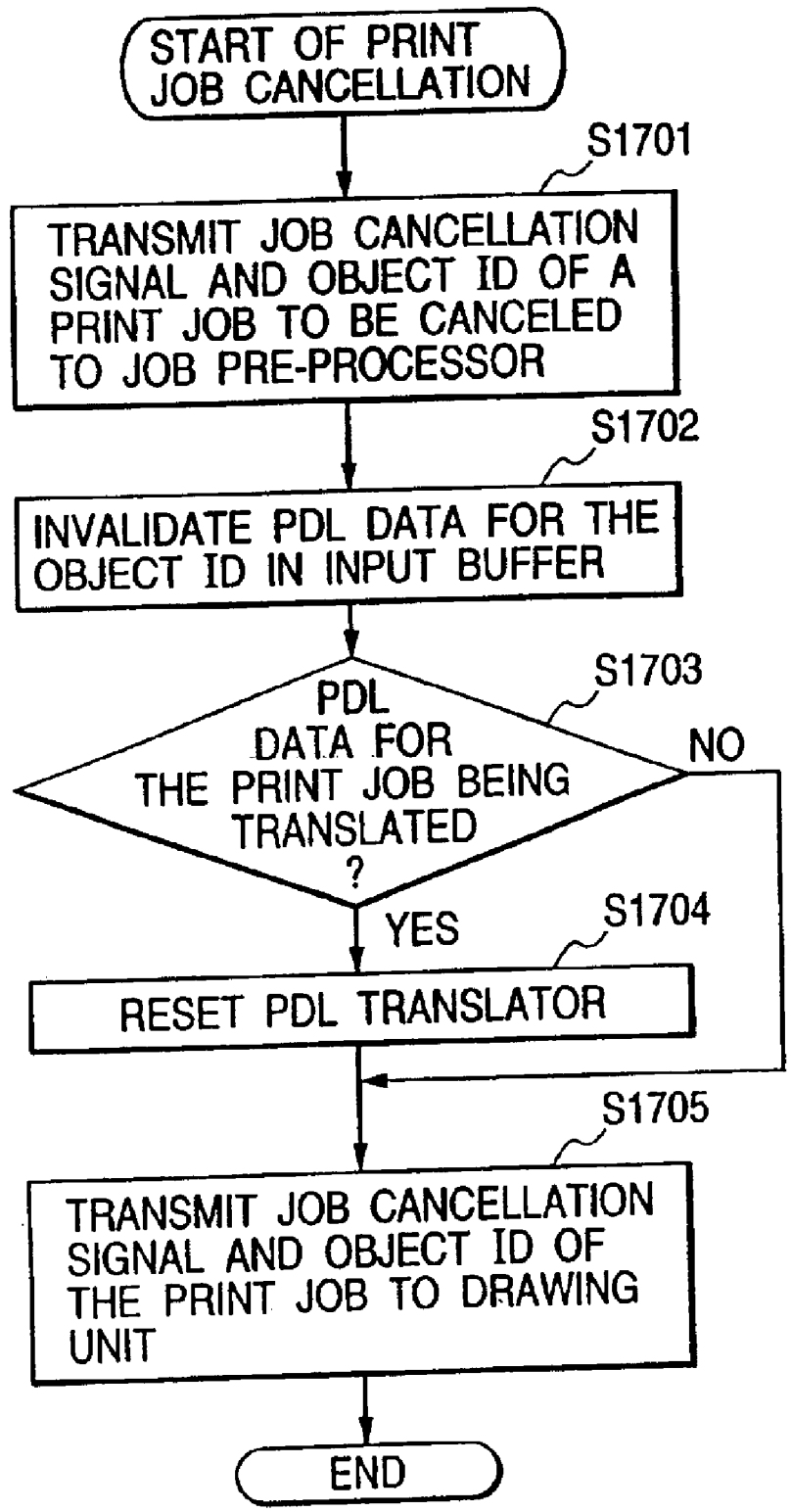
FIG. 17 is a flowchart showing the print job cancellation processing performed by an information manager according to the first embodiment of the present invention.

FIG. 17 is a flowchart showing the print job cancellation processing performed by the information manager 160. When the information manager 160 receives a control packet in which is stored the operation code (=0x010b) for instructing the cancellation of a print job, at step S1701 the information manager 160 transmits to the job pre-processor 153 a print job cancel signal and the object ID of the print job to be canceled. Then, the information manager 160 waits until the job pre-processor 153 completes the processing shown in the flowchart in FIG. 18. Upon receiving an end notification from the job pre-processor 153, the information manager 160 begins the process at step S1702.

At step S1702 the object ID stored in the header of the buffer block in the input buffer 154 is examined. When the object ID matches the object ID of the print job to be canceled, the PDL data stored in the buffer block for that object ID are invalidated.

Figure 35:
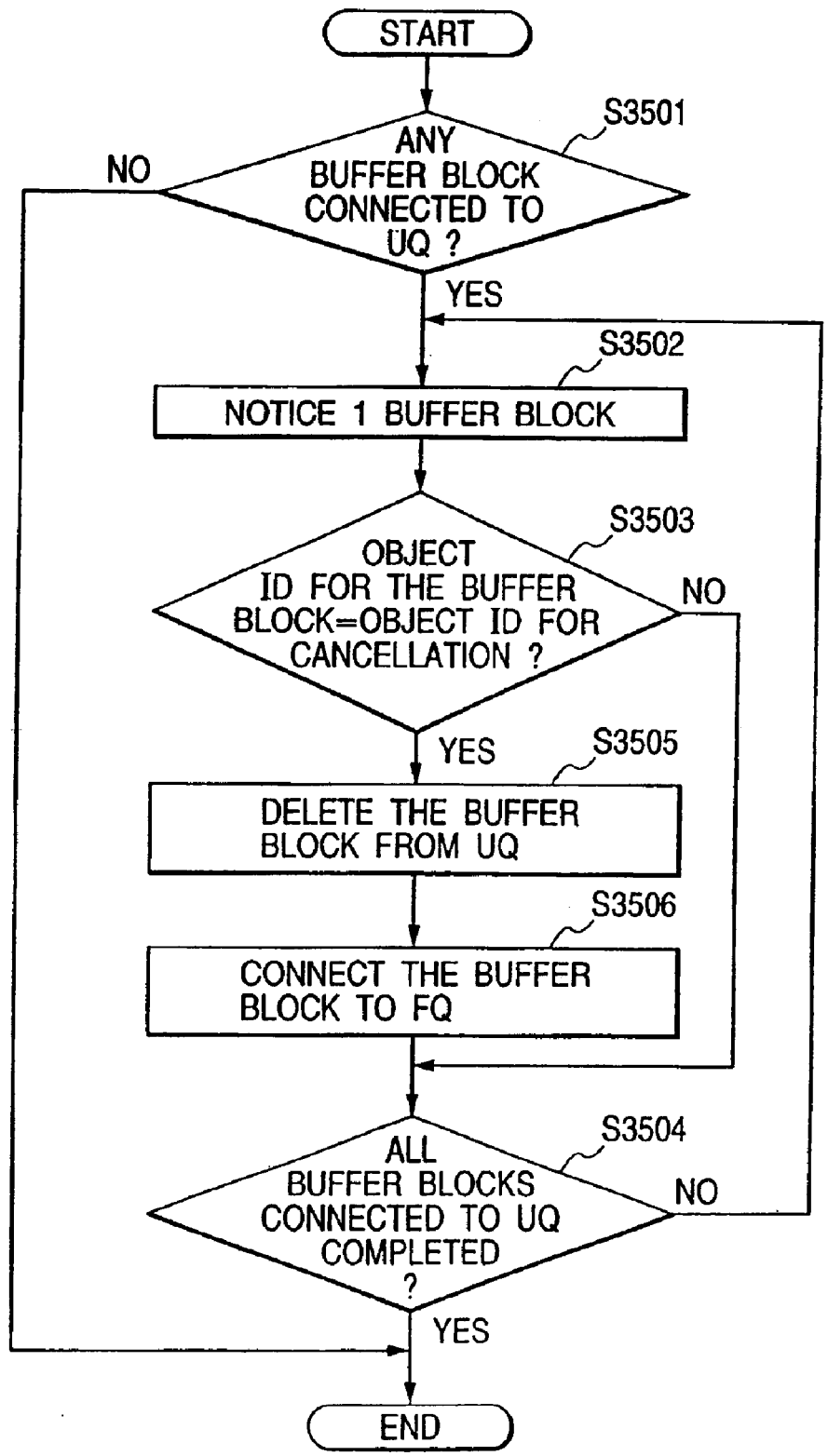
FIG. 35 is a flowchart showing the processing performed by an information processor to invalidate PDL data in the input buffer.

A specific explanation will now be given for the processing performed by the information manager 160 to invalidate PDL data for a print job to be canceled. FIG. 35 is a flowchart showing the processing performed by the information manager 160 to invalidate PDL data, for a print job to be canceled, that are stored in the input buffer 154.

First, at step S3501 a check is performed to determine whether there are buffer blocks connected to used queue UQ. If no buffer blocks are connected, the processing is thereafter terminated.

If there are buffer blocks connected to used queue UQ, at step S3502 one of the buffer blocks (other than a buffer block that was previously employed at this step) is examined. At step S3503, a check is performed to determine whether the object ID stored in the header of the buffer block matches the object ID of the print job to be canceled.

When the two object IDs do not match, program control moves to step S3504.

When the two object IDs match, at step S3505 the buffer block is deleted from used queue UQ. At step S3506 the buffer block that is deleted is connected to free queue FQ. Program control then advances to step S3504.

At step S3504 a check is performed to determine whether all the buffer blocks connected to used queue UQ have been examined. When all the buffer blocks have been examined, the processing is thereafter terminated. When not all the buffer blocks have been examined, at step S3502 the remaining buffer blocks are examined and the processing is repeated.

As is described above, the headers of all the buffer blocks connected to used queue UQ are examined. A buffer block whereof the object ID of the print job to be canceled is stored in the header is deleted from used queue UQ, and is connected to free queue FQ. Then, for a print job that is to be canceled, the PDL data that are stored in the input buffer 154 are invalidated.

As a result, since a print job for which PDL data stored in a buffer block of the input buffer 154 can easily be identified by using the object ID, the PDL data for a print job that is to be canceled can be invalidated in the input buffer 154.

At step S1703 in FIG. 17, the state of the print job that is managed in the database 152 is examined to determine whether the PDL data for the print job are being translated by the PDL translator 155. If the PDL data are being translated, at step S1704 the PDL translator 155 is reset and abandons the PDL data. Finally, at step S1705 the print job cancel signal and the object ID of the print job are transmitted to the drawing unit 157. The processing is thereafter terminated.

As is described above, the PDL data for a print job to be canceled, and print data, such as a drawing object, are invalidated beginning with those near the input stage. Therefore, even when the print data for a print job are present in a plurality of locations, all the data can be invalidated, except for the data that have been used for printing by the printer engine 158.

Figure 18:
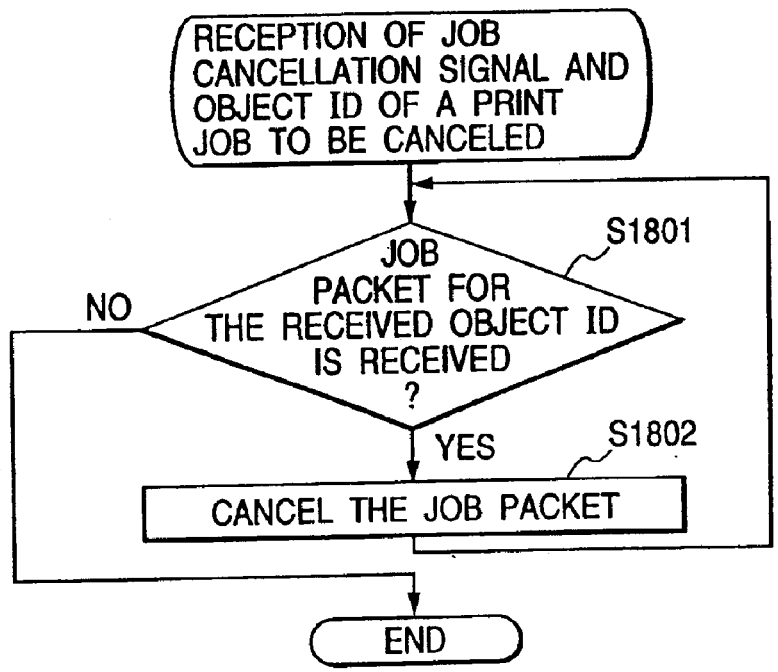
FIG. 18 is a flowchart showing the print job cancellation processing performed by a job pre-processor according to the first embodiment of the present invention.

An explanation will now be given for the processing performed by the job pre-processor 153 at step S1701 in FIG. 17. FIG. 18 is a flowchart showing the print job cancellation processing performed by the job pre-processor 153.

As is described above, the transmission of a print job by the job packet generator 107 begins with the transmission of a job packet in which the job start operation code (0x0201) is stored, and ends with the transmission of a job packet in which the job end operation code (0x0205) is stored. When the job pre-processor 153 receives a job packet in which the job start operation code (0x0201) is stored, the job pre-processor 153 registers in the database 152 the object ID that is uniquely allocated for the print job. Therefore, since the last object ID of the print job is stored, a print job to which a currently received job packet belongs can be identified.

When a print job signal and the object ID of a print job are received from the information manager 160, and when at step S1801 a job packet that was most recently received is for a print job that matches the received object ID, at step S1802 the job packet is abandoned. Program control then returns to step S1801. When at step S1801 a most recently received job packet is not for the pertinent print job, the processing is terminated. To terminate the processing, an end notification is transmitted to the information manager 160.

Figure 19:
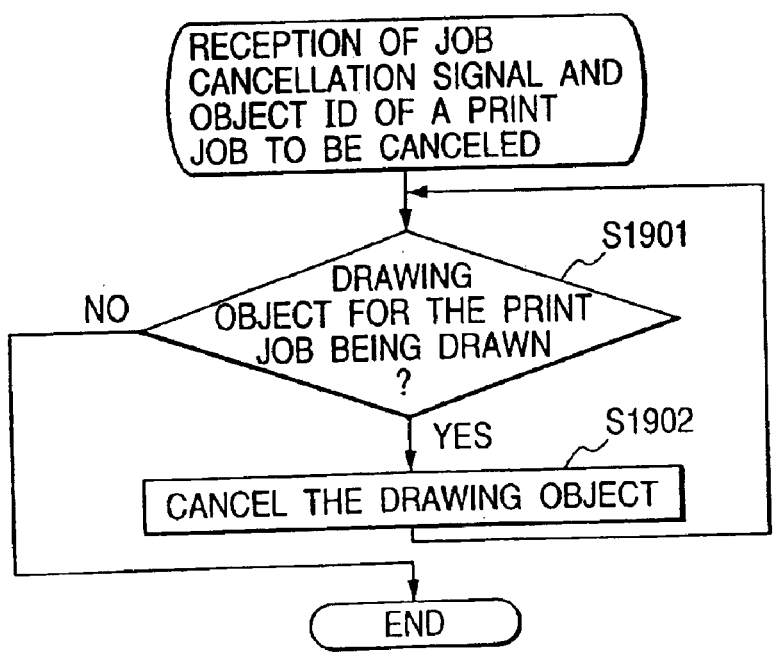
FIG. 19 is a flowchart showing the print job cancellation processing performed by a drawing unit according to the first embodiment of the present invention.

An explanation will now be given for the operation performed by the drawing unit 157 at step S1705 in FIG. 17. FIG. 19 is a flowchart showing the print job cancellation processing performed by the drawing unit 157.

When a print job cancellation signal and the object ID of a print job are received from the information manager 160, at step S1901 a check is performed to determine whether a drawing object for the print job that matches the received object ID is being currently drawn. If the drawing object for the print job is being drawn, at step S1902 the drawing is halted and the drawing object is abandoned. Program control then returns to step S1901. If the drawing object for the pertinent print job is not being drawn, the processing is terminated. For this processing, not only the data for the pertinent print job in the drawing unit, but also the drawing object for the print job stored in the drawing buffer 156 can be abandoned.

Similarly, the setup of attributes, the instruction for the halting of the printer 150, the instruction for the recovery of the printer 150, and the instruction for the resetting of the printer 150 can be performed by transmitting the control packet from the utility unit 105 of the host computer 100 to the information manager 160 of the printer 150.

Figure 20:
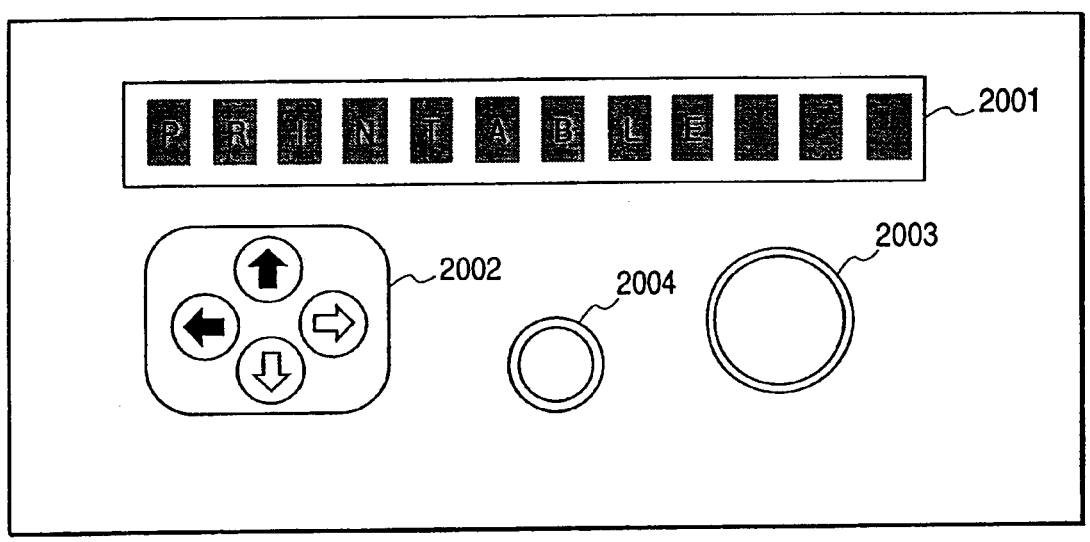
FIG. 20 is a specific diagram showing the structure of an operation panel according to the first embodiment of the present invention.

The operation panel 161 of the printer 150 will now be described. FIG. 20 is a specific diagram showing the structure of the operation panel 161. A liquid crystal screen 2001 is used to display the state of the printer 150 and messages. A cursor button 2002 is used to select and establish a setup item for the printer 150. An on-line key 2003 is used to change the on-line/off-line status of the printer 150. A cancellation button 2004 is used to select the cancellation of a print job, and when the cancellation button 2004 is depressed, the information manager 160 of the printer 150 is notified.

Figure 21:
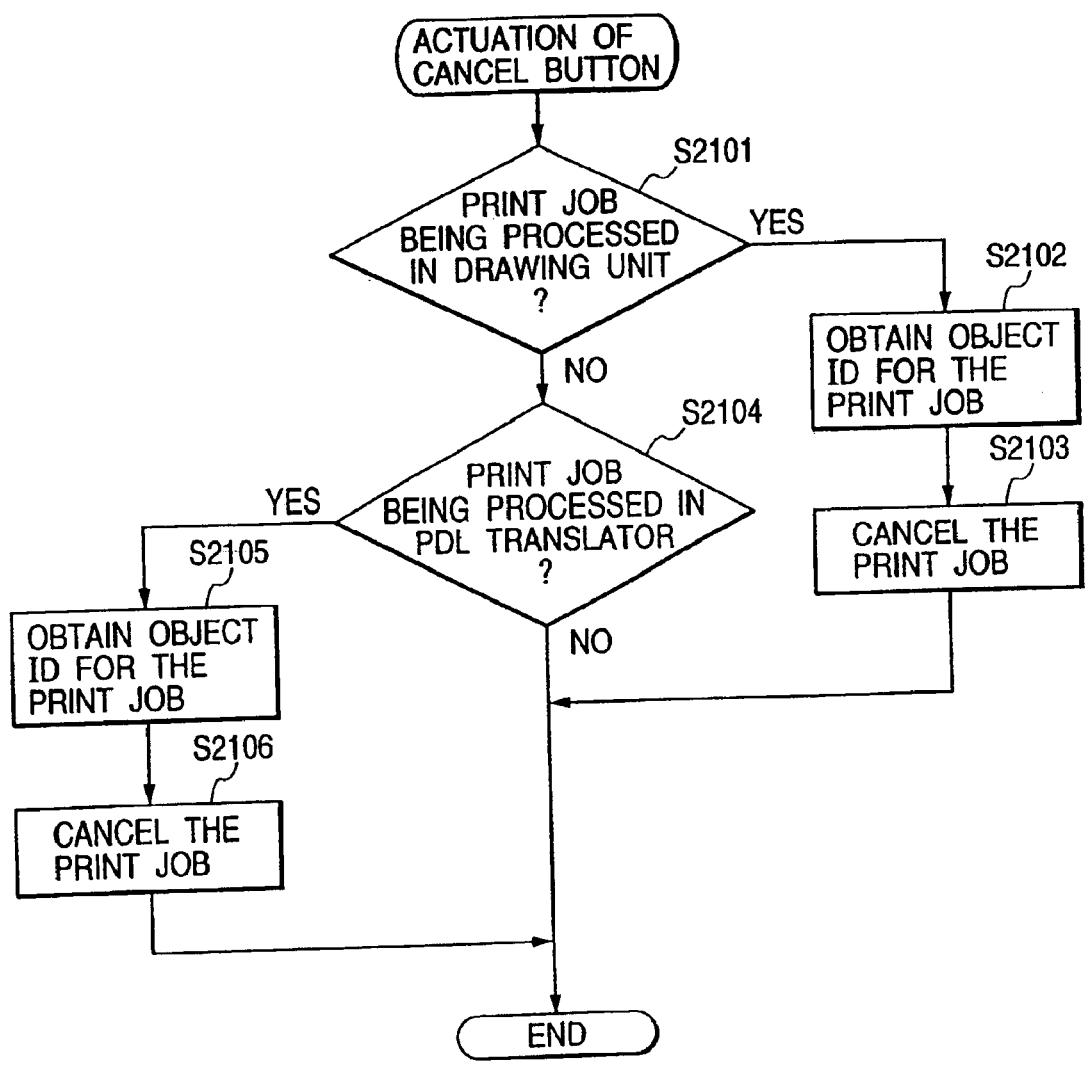
FIG. 21 is a flowchart showing the processing performed by the information manager when a cancel button is depressed according to the first embodiment of the present invention.

An explanation will now be given for the print job cancellation processing performed when the cancellation button 2004 is depressed. FIG. 21 is a flowchart for explaining the print job cancellation processing performed by the information manager 160 upon depression of the cancellation button 2004. At step S2101 a check is performed to determine whether a print job is currently being processed by the drawing unit 157. If a print job is being processed, at step S2102 the object ID of that print job is obtained, and at step S2103 the print job is canceled. The processing is thereafter terminated. When no print job is being processed, at step S2104 a check is performed to determine whether a print job is currently being processed by the PDL translator 155. When a print job is being processed by the PDL translator 155, at step S1205 the object ID of the print job is obtained, and at step S1206 the print job is canceled. The processing is thereafter terminated.

At steps S1203 and S1206, based on the object ID of the print job to be canceled, the cancellation process is initiated in accordance with the flowchart in FIG. 18. The presence/absence of a print job that is being processed by the drawing unit 157 or the PDL translator 155 can be determined by examining the states of all the print jobs of the printer 150 that are stored in the database 152.

Therefore, since only a print job that is near the output stage is canceled, only a print job that is being processed can be canceled by confirming that material has been printed, or when print data have been processed for an extended period of time and the printing has not yet begun, only the first print job that causes to halt the printing to be halted for an extended period of time can be canceled.

In a case where a plurality of print jobs may be present in the input buffer 154 and the drawing buffer 156, a print job to be canceled must be determined in accordance with the specifications for the printer 150. Since in this embodiment none of the print jobs is to be canceled, whether or not a print job is present in the input buffer 154 and the drawing buffer 156 is not taken into consideration when selecting a print job to be canceled.

As is described above, according to the first embodiment of the present invention, the printing system comprises the host computer 100 and the printer 150 that are interconnected via the communication medium 180. The host computer 100 comprises: the job packet generator 107 for adding a header to print data for a print job that has been generated in order to form a packet; the utility unit 105 for obtaining the processing state of a print job or setting the attribute of a print job for the printer 150; and the logic channel controller 106, for forming a packet for a job channel that is used to transmit a print job and for a control channel that is used to transmit a control request from the utility unit 105, and for multiplexing the packet for a single communication medium. The printer 150 comprises: the job pre-processor 153 for detecting the start and the end of a print job based on information that is described in the header of a job packet received from the host computer 100, and for registering the print job in the database 152; the logic channel controller 151 for employing a packet to multiplex a job channel and a control channel for a single communication medium; the information manager 160 for setting up information for a print job or for canceling a print job in accordance with a request in a received control packet; and the operation panel 161 used to display the state of the printer 150 and messages and for entering an instruction for the cancellation of a print job. Therefore, the following effects can be obtained.

With the above arrangement, the job packet generator 107 of the host computer 100 forms, for each print job, a packet that consists of PDL data and the attributes, and the job pre-processor 153 of the printer 150 detects the start and the end of the print job. Therefore, an object ID can be allocated for the print job, without the PDL data for the print job being analyzed.

In addition, since the job pre-processor 153 stores an object ID in the input buffer 154 with PDL data, and since the states of the individual print jobs are managed in the database 152, PDL data for a print job to be canceled can be invalidated even when they have not yet been analyzed by the PDL translator 155.

Further, since the print data concerning a print job to be canceled are invalidated beginning with the data near the input stage, all the print data for the print job can be invalidated, except for those print data that have been used for printing by the printer engine 158.

Furthermore, the job channel and the control channel are multiplexed, relative to the communication medium 180, by the logic channel controller 106 of the host computer 100 and the logic channel controller 151 of the printer 150. Therefore, even during the exchange of a print job along the job channel, the utility unit 105 of the host computer 100 can obtain or set up the information for the print job of the printer 150, and can thus cancel the print job in real time.

Moreover, the cancellation of a print job not only can be instructed by the utility unit 105, but also can be instructed using the operation panel 161 of the printer 150, so that a user can halt the printing while confirming the material that has been printed.

In addition, since the print job to be canceled is determined to be a print job that is near the output stage, only a print job that is being printed can be canceled while the printed material is being confirmed, or when the processing of print data has been continued for a long time and the printing has not been started, only the first print job that causes of the printing process to be halted can be canceled.

Second Embodiment

In the first embodiment of the present invention, an IEEE 1284.4 logic channel is mounted on the upper layer through an IEEE 1284 local connection. In a second embodiment of the present invention, an explanation will be given for a system employing the ethernet (the local area network having a bus that we structure jointly developed by Xerox Corp., DEC Corp. and Intel Corp.).

Figure 22:
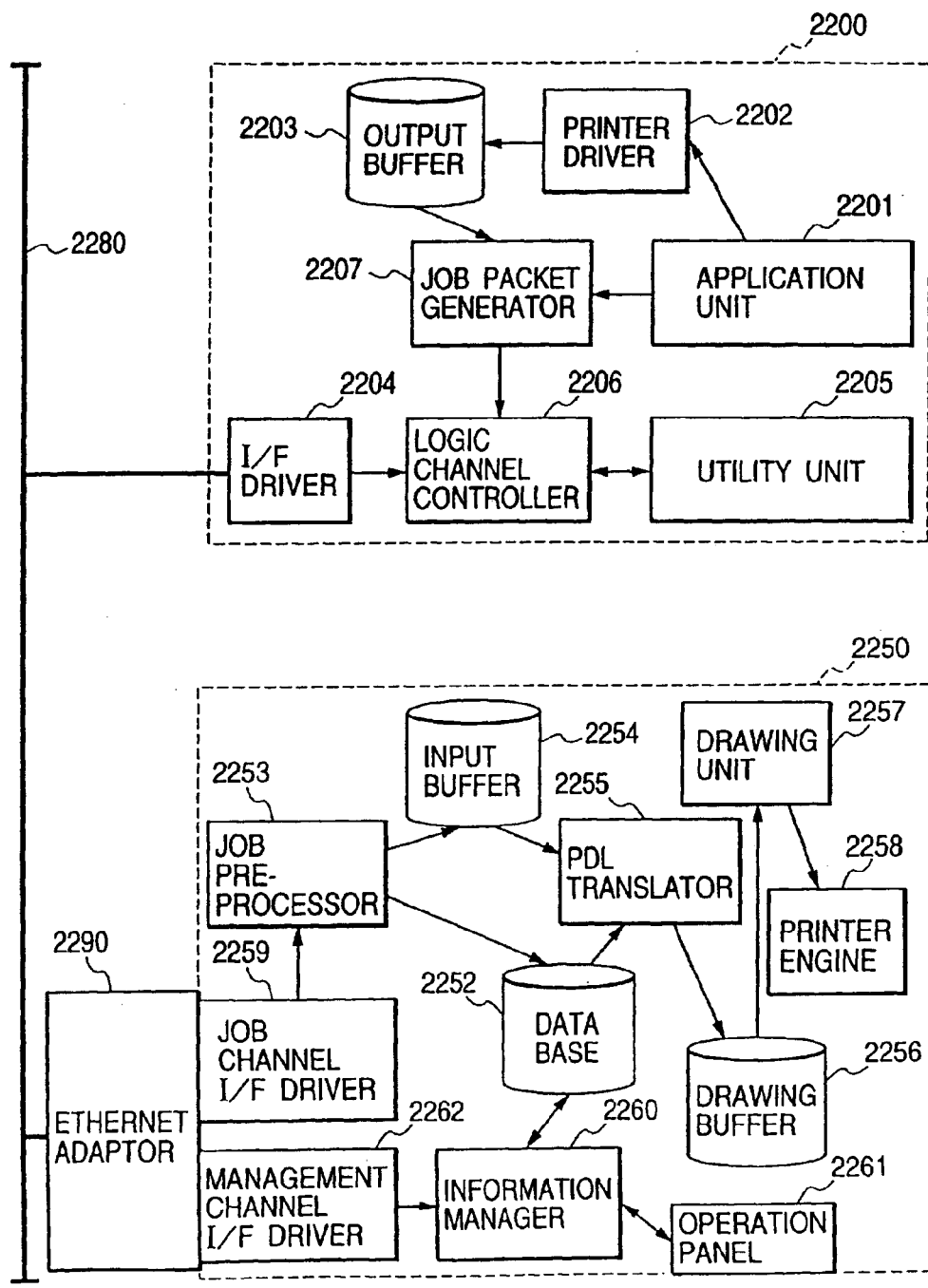
FIG. 22 is a specific block diagram illustrating the arrangement of a printing system according to a second embodiment of the present invention.
Figure 23:
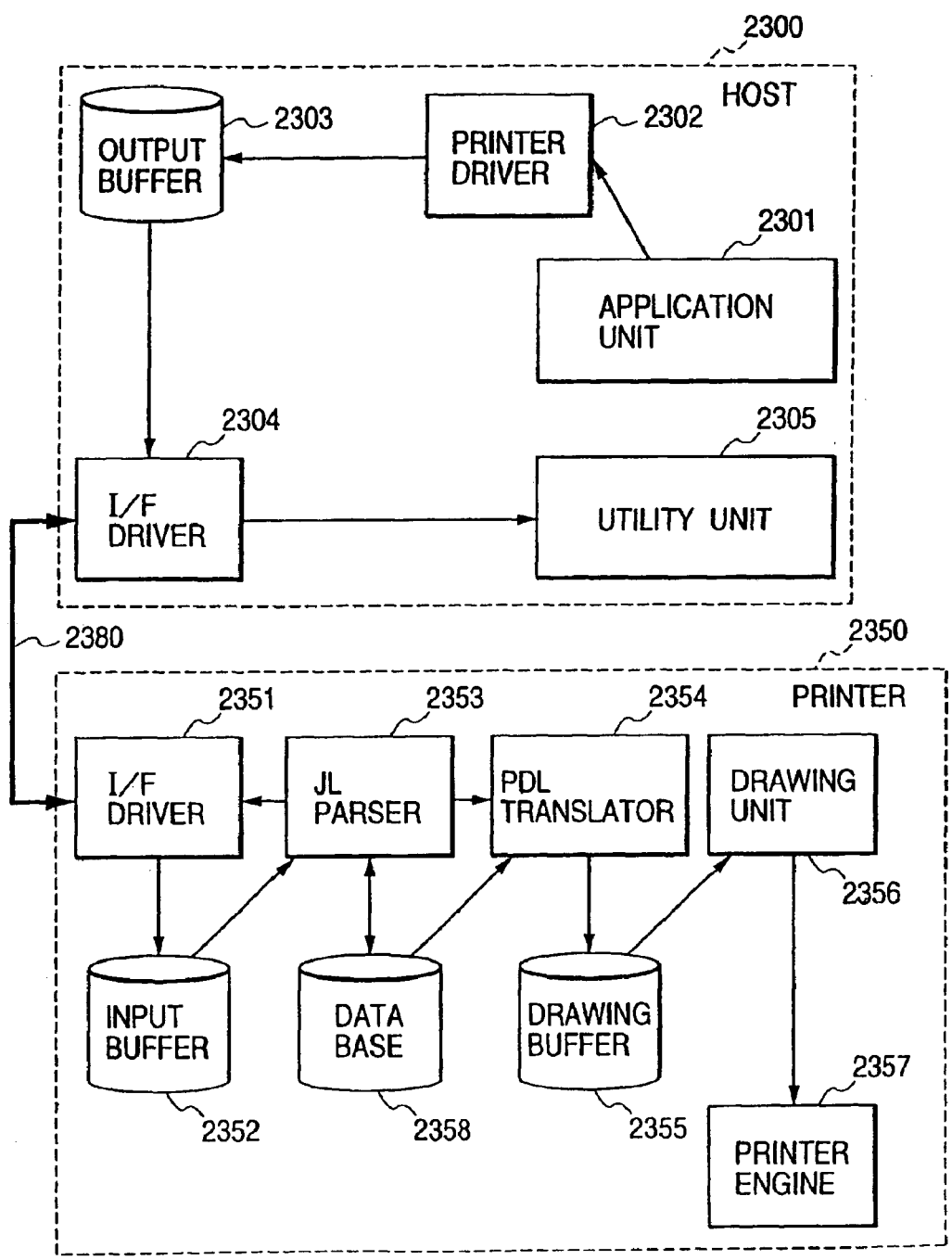
FIG. 23 is a specific block diagram illustrating the arrangement of a conventional printing system.

FIG. 22 is a specific block diagram illustrating the arrangement of a printing system according to the second embodiment of the present invention. In the printing system according to the second embodiment, a host computer 2200 and a printer 2250 are interconnected via the ethernet 2280.

According to the second embodiment of the present invention, the host computer 2200 of the printing system comprises: an application unit 2201, a printer driver 2202, an output buffer 2203, an I/F driver 2204, a utility unit 2205, a logic channel controller 2206, and a job packet generator 2207.

The printer 2250 of the printing system comprises a database 2252, a job pre-processor 2253, an input buffer 2254, a PDL translator 2255, a drawing buffer 2256, a drawing unit 2257, a printer engine 2258, a job channel I/F driver 2259, an information manager 2260, an operation panel 2261, and a control channel I/F driver 2262. An ethernet adaptor 2290 is attached to the printer 2250.

The difference from the first embodiment is that a logic channel controller is not provided for the printer 2250; that the I/F driver is divided into the job channel I/F driver 2259 and the control channel I/F driver 2262 and these I/F drivers 2259 and 2262 are connected to the ethernet adaptor 2290; and that the ethernet 2280 is employed as a connection method. Since the other arrangements are the same as those for the first embodiment, no further explanation will be given.

In the second embodiment, the job channel I/F driver 2259 and the control channel I/F driver 2262 are connected to the ethernet adaptor 2290, which forms a packet for the job channel and the control channel. When TCP/IP (Transmission Control Protocol/Internet Protocol: the standard protocol of a computer network) is employed and when, for example, TCP 515 (this port is used as lpd) is used for the job channel and UDP (User Datagram Protocol: communication protocol for a transportation layer that does not guarantee reliability) 9100 is used for the control channel, a conflict between the two channels can be prevented.

As is described above, according to the second embodiment, the printing system comprises the host computer 2200 and the printer 2250 that are interconnected via the communication medium (ethernet) 220. The host computer 2200 comprises: the job packet generator 2207 for adding a header to print data for each print job that is generated in order to form a packet; the utility unit 2205 for obtaining the processing state of a print job or setting the attribute of a print job for the printer 2250; and the logic channel controller 2206 for forming a packet for a job channel that is used to transmit a print job and for a control channel that is used to exchange a control request from the utility unit 2205, and for multiplexing the packet for a single communication medium. The printer 2250 comprises: the job pre-processor 2253 for detecting the start and the end of a print job based on information that is described in the header of a job packet received from the host computer 2200, and for registering the print job in the database 2252; the information manager 2260 for setting up information for a print job or for canceling a print job in accordance with a request contained in a received control packet; and the operation panel 2261 used to display the state of the printer 2250 and messages and to enter an instruction for the cancellation of a print job. In addition, the ethernet adaptor 2290 is provided between the printer 2250 and the communication medium (ethernet) 2280 to change a job channel and a control channel into a logic channel. Therefore, the following effects can be obtained.

With the above arrangement, the job packet generator 2207 of the host computer 2200 forms, for each print job, a packet that consists of PDL data and the attributes, and the job pre-processor 2253 of the printer 2250 detects the start and the end of the print job. Therefore, the object ID can be allocated to the print job, without the PDL data of the print job being analyzed.

In addition, since the job pre-processor 2253 stores an object ID in the input buffer 2254 with the PDL data, and since the states of the individual print jobs are managed in the database 2252, the PDL data for a print job to be canceled can be invalidated even when they have not yet been analyzed by the PDL translator 2255.

Further, since the print data concerning a print job to be canceled are invalidated beginning with the data near to the input stage, all the print data for the print job can be invalidated, except for those print data that have been used for printing by the printer engine 2258.

Furthermore, the job channel and the control channel are multiplexed relative to the communication medium 2280 by the logic channel controller 106 of the host computer 2200 and the logic channel controller 2251 of the printer 2250. Therefore, even during the exchange of a print job along the job channel, the utility unit 2205 of the host computer 2200 can obtain or can set up information for the print job of the printer 2250, and thus the print job can be canceled in real time.

Moreover, not only can the cancellation of a print job be instructed by the utility unit 2205, but it can also be instructed using the operation panel 2261 of the printer 2250, so that a user can halt the printer and prevent the printing of a print job that is not needed.

In addition, since the print job to be canceled is determined to be a print job that is near the output stage, only a print job that is being printed can be canceled while the printed material is being confirmed, or when the processing of print data has been continued for a long time and the printing has not been started, only the first print job that causes of the printing process to be halted can be canceled.

Further, since the ethernet 2280 is employed as the communication medium, a printing system having the above effects can be constructed on the network.

Figure 28:
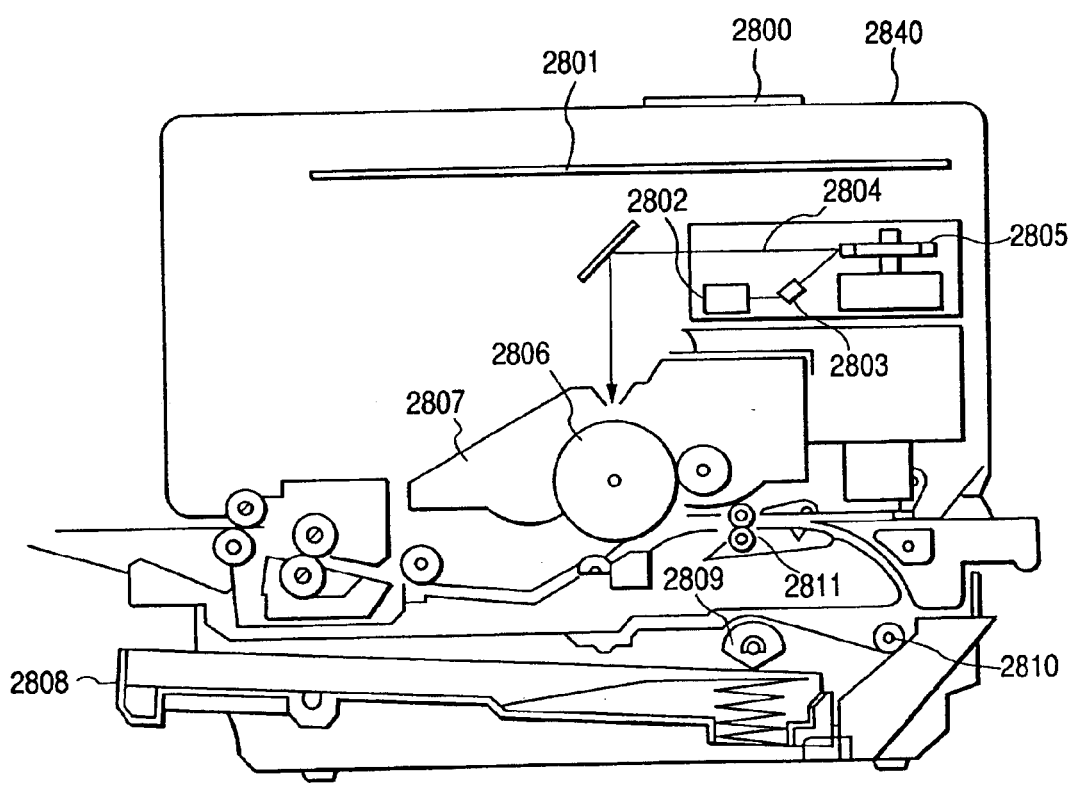
FIG. 28 is a cross-sectional view of the internal structure of a laser beam printer.

According to the first and the second embodiments of the present invention, a laser beam printer may be employed as the printer. FIG. 28 is a cross-sectional view of the internal structure of the laser beam printer (hereinafter referred to simply as an "LBP"). The LBP can print input character pattern data on a sheet of recording paper.

In FIG. 28 an LBP unit 2840 employs a received character pattern to form an image on a sheet of recording paper that is the recording medium. An operation panel 2800 includes operation switches and an LED display device, and a printer control unit 2801 exercises the overall control of the LBP 2840 and analyzes character pattern information. The printer control unit 2801 mainly converts character pattern information into a video signal, and outputs the signal to a laser driver 2802.

The laser driver 2802, which is a circuit for driving a semiconductor laser 2303, turns on or off a laser beam 2804 emitted by the semiconductor layer 2803 in accordance with a received video signal. The laser beam 2804 is deflected to the right and left by a rotary polyhedric mirror 2805 and scans an electrostatic drum 2806. Thus, an electrostatic latent image of a character pattern is formed on the electrostatic drum 2806. This latent image is developed by a developing unit 2807 located on the periphery of the electrostatic drum 2806, and the developed image is transferred to a recording sheet. A cut sheet is used as a recording sheet. The cut sheets are stored in a plurality of sheet cassettes 2808 that are loaded into the LBP 2840 and that correspond to a plurality of types of sheets, and are fed into the LBP 2840 by a paper feed roller 2809 and delivery rollers 2810 and 2811 and are transported to the electrostatic drum 2806.

Figure 36:
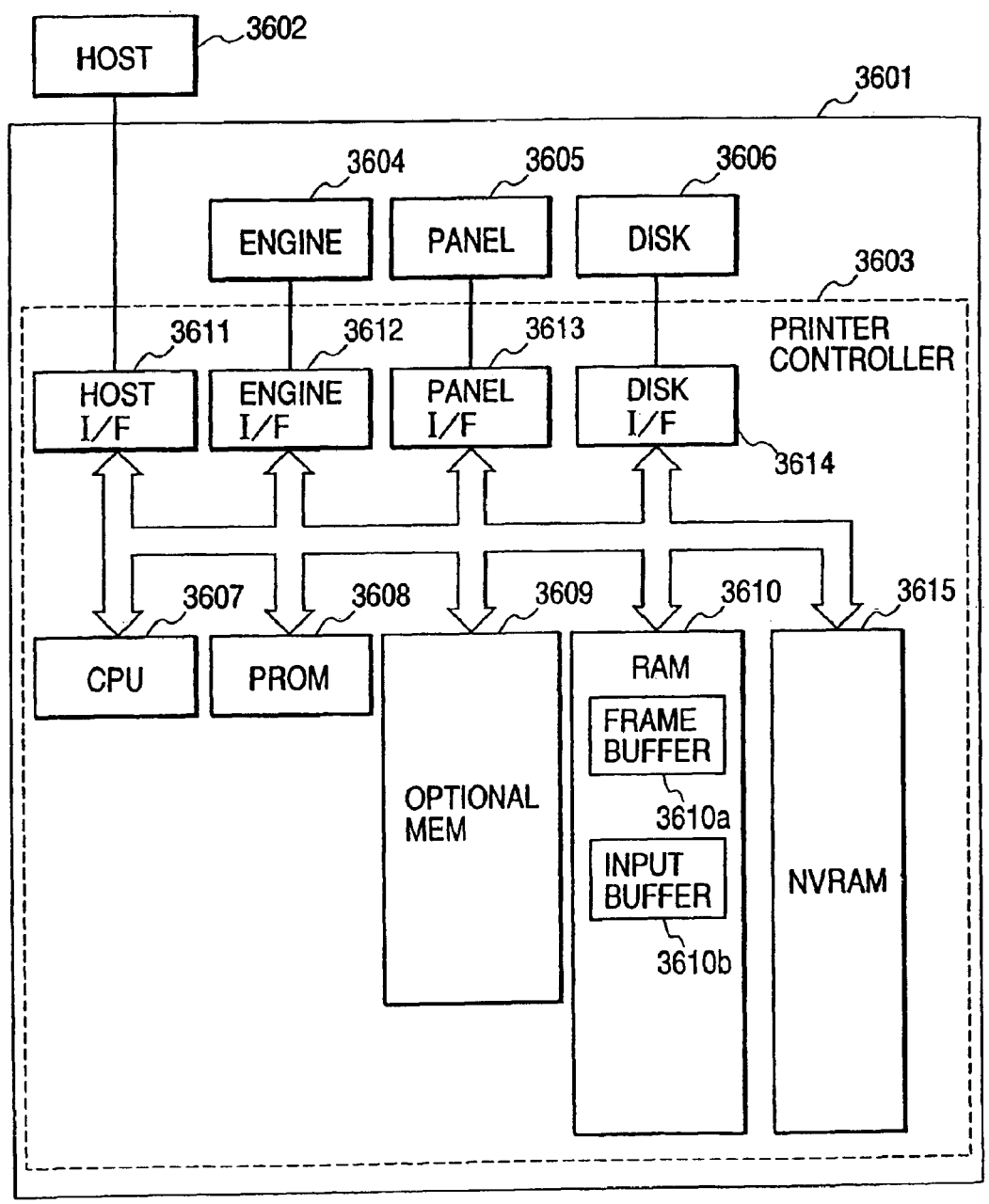
FIG. 36 is a block diagram showing the control arrangement for a laser beam printer.

The control arrangement of a laser beam printer will now be described. FIG. 36 is a block diagram showing the arrangement of the laser beam printer. In FIG. 36, a laser beam printer 3601 comprises a printer controller (hereinafter referred to as a controller) 3603, an engine 3604, a panel 3605, and a disk 3606.

The controller 3603 includes a CPU 3607, a PROM 3608, an optional memory 3609, a RAM 3610, a host I/F 3611, an engine I/F 3612, a panel I/F 3613, a disk I/F 3614, and an NVRAM 3615.

The CPU 3607 controls the individual sections based on control programs shown in the flowcharts in FIGS. 4, 5, 11 through 19, 21, 33 through 35, and various other control programs. The host I/F 3611 is an interface for the exchange of a print job with the host computer 3602. The engine I/F 3612 is an interface for communicating with the engine 3604 that actually performs the printing.

The panel I/F 3613 is an interface used to exchange with the panel 3605 an instruction for the changing of a printing environment, which is entered by a user using the panel 3605, and the state of the laser beam printer 3601, which is displayed for a user on the panel 3605. The disk I/F 3614 is an interface for communicating with the disk 3606.

The optional memory 3609 is a memory, such as a card, an optional ROM or a flash memory, that can be loaded and unloaded in order to store fonts. The RAM 3610 includes an image buffer 3610*a* for the storage of image data and an input buffer 3610*b* for temporarily storing PDL data that are received from a host computer 3602. The RAM 3610 is also used as a work area for the CPU 3607. The NVRAM 3615 is used to store setup values for various items concerning a device or a print job.

On the panel 3605 are provided a liquid crystal display device for displaying information, such as the state of the laser beam printer 3601, using a character string, various operating buttons used by a user to instruct the laser beam printer 3601 to perform various operations, and an LED to notify a user of when it is time to load paper or to signal the on-line/off-line state.

The engine 3604 actually prints a drawing object on a recording medium. The disk 3606 is an external storage device for the storage of various data, a hard disk, a magneto-optical disk or a floppy disk. The laser beam printer 3601 receives power from a power source (not shown).

The components in the functional arrangement of the printing system in FIG. 1, e.g., the logic channel controller 151, the job pre-processor 153, the PDL translator 155, the drawing unit 157 and the information manager 160, can be implemented by performance by the CPU 3607, of the laser beam printer 3601 in FIG. 36, of a control program stored in the PROM 3608. The input buffer 154 and the drawing Buffer 156 in FIG. 1 are prepared in the RAM 3610 of the laser beam printer 3601 in FIG. 36. This can be applied for the second embodiment.

Figure 29:
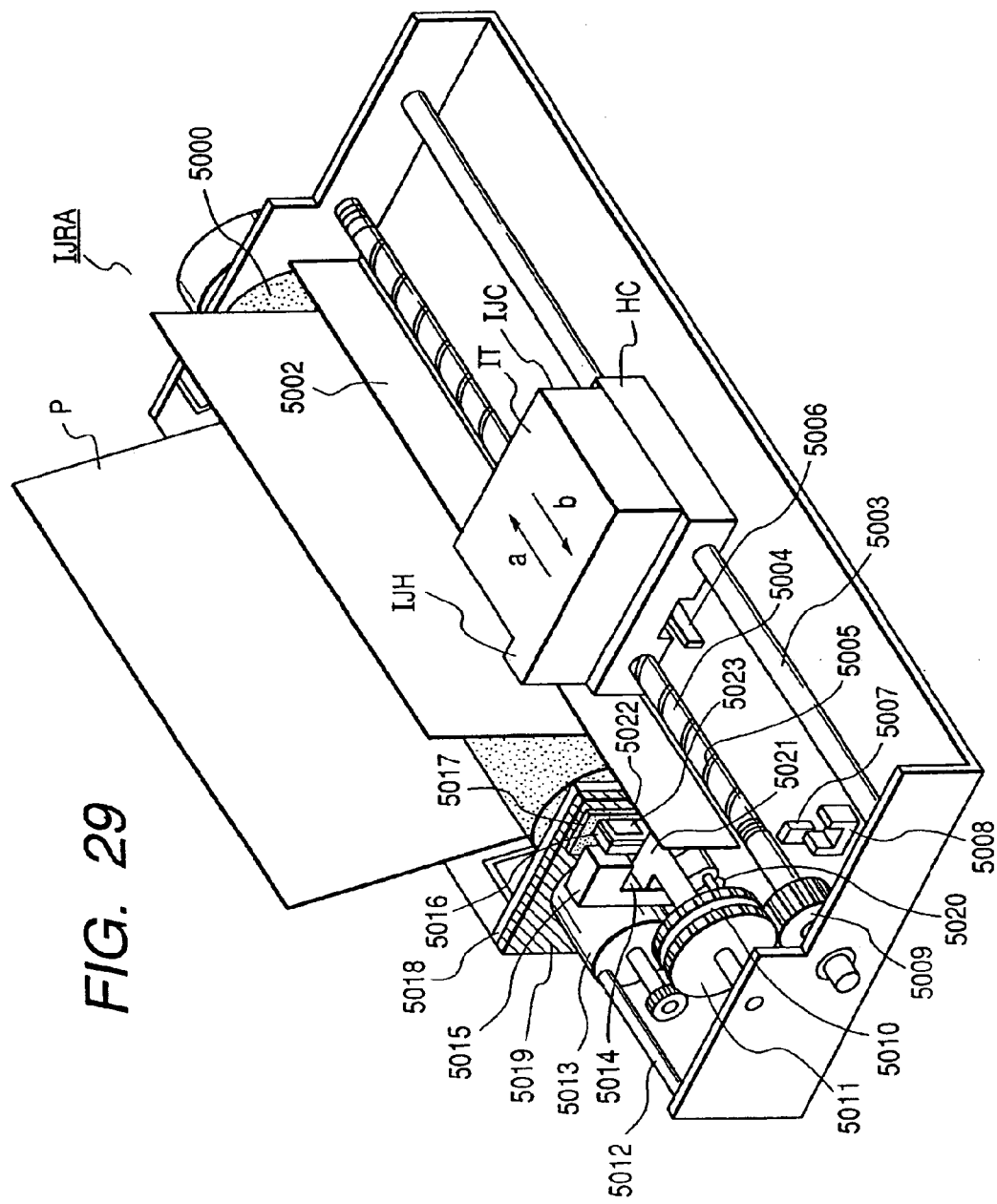
FIG. 29 is a diagram showing the outline of an ink-jet recording apparatus IJRA.

A laser beam printer is employed as a printer for the first and the second embodiments of the present invention. The type of printer is not limited to a laser printer, and an ink-jet printer may be employed. FIG. 29 is a diagram showing the external appearance of an ink-jet recording apparatus IJRA that can feed a plurality of types of paper (not shown) in accordance with the needs of a print job.

In FIG. 29, a carriage HC, which has a pin (not shown), is moved in directions indicated by arrows a and b, while it engages a spiral groove 5004 of a lead screw 5005 that interacts with the forward and backward rotation of a drive motor 5013 and is rotated by the drive force transmission gears 5011 and 5009. An ink-jet cartridge IJC is mounted on the carriage HC. A paper holding plate 5002 presses paper against a platen 5000 in the direction in which the carriage HC moves. Photocouplers 5007 and 5008 are home position detection means for identifying the presence of a carriage lever 5006 in this area, and for changing the direction in which the drive motor 5013 is rotated. A member 5016 supports a cap member 5022 for sealing the front face of a recording head; and suction means 5015 attracts the cap in order to recover the recording head via a cap opening 5023. A member 5019 moves a cleaning plate 5017 forward and backward, and the cleaning plate 5017 and the member 5019 are supported on a support plate 5018. Instead of this cleaning blade 5017, a well known cleaning blade may be employed for this embodiment. A lever 5021 is used to start the attraction for the recovery. The lever 5021 is displaced in accordance with the movement of a cam 5020 that engages the carriage HC, and the drive force from the drive motor 5013 is controlled by a well known transmission means, such as by the switching performed using a clutch. When the carriage HC reaches the home position area, a desired process, either the capping, cleaning or the suction recovery, can be performed at a corresponding position by the operation of the lead screw 5005. If a desired operation is to be performed in accordance with a well known timing, the above arrangement can be applied for either embodiment.

The arrangement of the ink-jet printer will now be described while referring to a block diagram in FIG. 30. In a control circuit in FIG. 30, an interface 1700 receives a recording signal. An MPU 1701 executes the control programs shown in the flowcharts in FIGS. 4, 5, 11 through 19, 21, 33 through 35, and various other programs, which are stored in a program ROM 1702. A DRAM 1703 is used to store various types of data (recording signals and record data to be supplied to a recording head). A gate array 1704 supplies record data to a recording head 1708, and also transfers data among the interface 1700, the MPU 1701 and the RAM 1703. A head carriage motor 1710 drives the recording head 1708, while motor drivers 1706 and 1707 drive a paper carriage motor 1709 and the head carriage motor 1710.

With this arrangement, after receiving a recording signal at the interface 1700, the recording signal is converted into print data between the gate array 1704 and the MPU 1701. The motor drivers 1706 and 1707 are driven, and accordingly the recording head is driven in accordance with the print data that are transmitted to the head driver 1705. Printing is thus performed.

The components of the present invention can be assembled using the above described arrangement for of the ink-jet printer. It is apparent that the present invention is not limited to the use of a laser beam printer, but that it can be also be applied for an ink-jet printer.

The present invention can be applied to a system that is constituted by a plurality of devices (e.g., a host computer, an interface device, a reader and a printer), or to an apparatus (e.g., a copier, a printer or a facsimile machine) that includes a single device.

Figure 26:
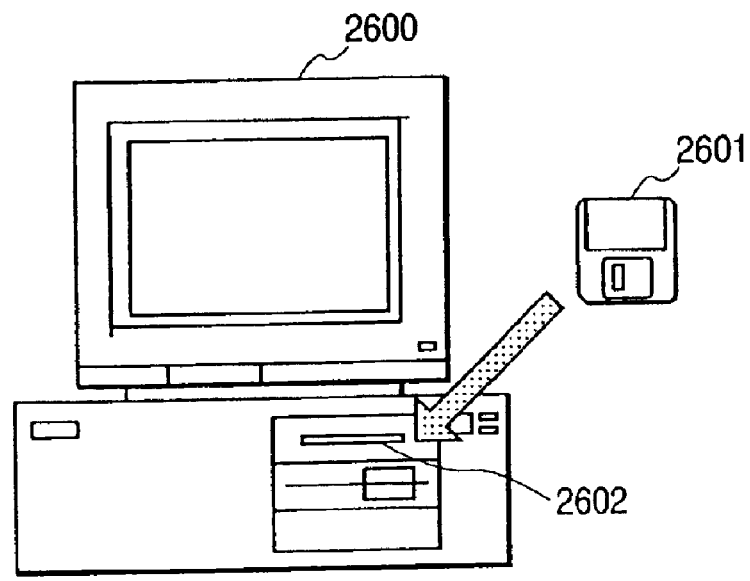
FIG. 26 is an explanatory diagram showing the loading of a storage medium into a system or an apparatus.

The object of the present invention is also achieved as follows: a memory medium on which is stored software program code for implementing the functions in the previous embodiments is supplied to a system or to an apparatus, as is shown in FIG. 26, and the computer (or a CPU or an MPU) in the system or the apparatus reads the program code from the memory medium. In this case, the program code read from the memory medium accomplishes the functions of the above described embodiments, and the memory medium on which such program code is recorded constitutes the present invention.

Further, the object of the present invention is achieved as follows: a memory medium on which is stored software program code for implementing the functions in the previous embodiments is supplied to a system or to an apparatus across a network or a public telephone line by a transmission device, e.g., by a Web server or an HTTP server, and the computer (or a CPU or an MPU) in the system or the apparatus reads the program code from the memory medium. In this case, the program code transmitted by the transmission device accomplishes the functions of the above described embodiments, and the transmission device that transmits such program code constitutes the present invention.

Figure 27:
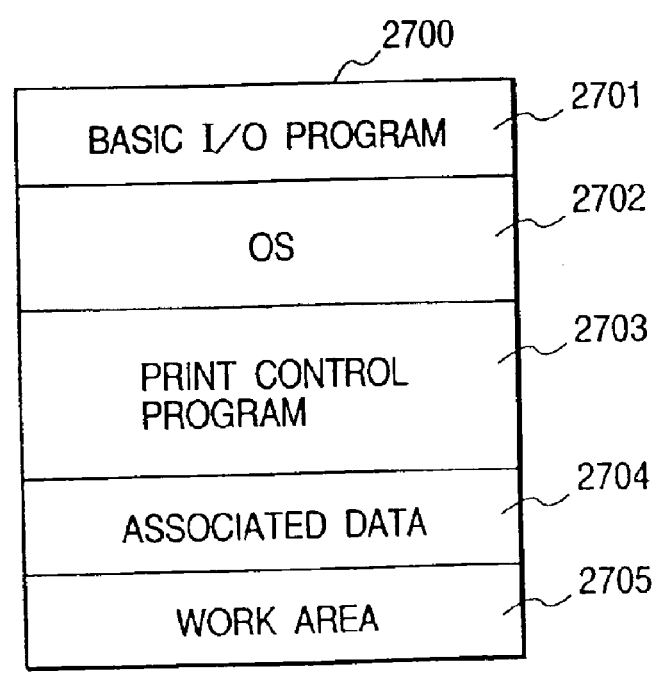
FIG. 27 is a diagram for explaining a memory map wherein a control program is stored in a ROM 1702 and is ready for execution.
Figure 30:
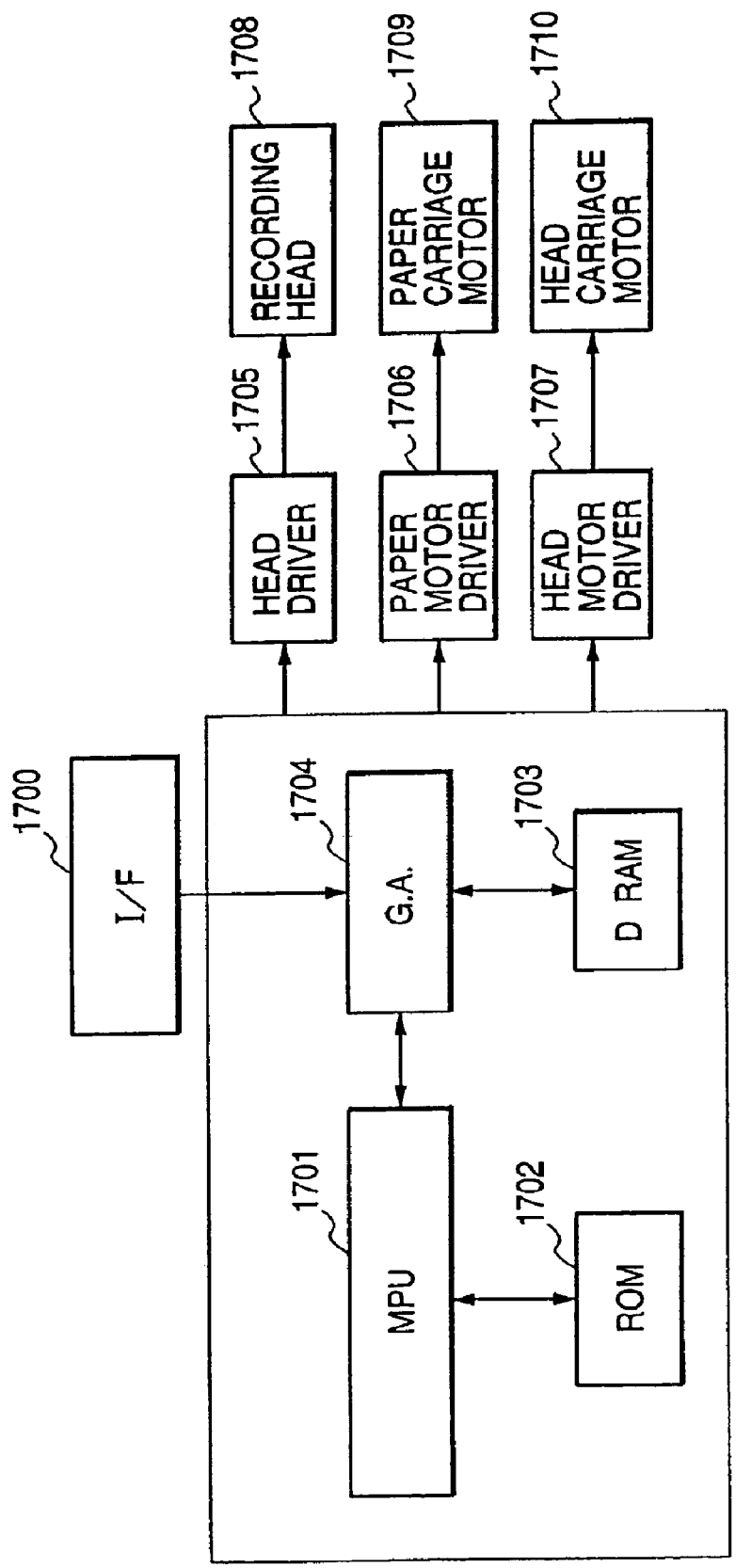
FIG. 30 is a diagram illustrating the control arrangement for executing a recording.

In FIG. 27 is shown a memory map for the control program of the present invention when it is stored in the ROM 1702 in FIG. 30 or in the PROM 3608 in FIG. 36, and is ready to be executed.

In the embodiments, to execute the control program and associated data, both are read from the storage medium and are stored directly in the ROM. However, the control program and associated data may be read from an external storage medium, such as a floppy disk and be temporarily stored (installed) on a hard disk, which is a nonvolatile storage medium provided for a system or for an apparatus, and may be loaded from the hard disk to the RAM to perform a program for the preparation and the transmission of the data.

A memory medium for supplying such program code can be, for example, a floppy disk, a hard disk, an optical disk, a magneto optical disk, a CD-ROM, a CD-R, a magnetic tape, a nonvolatile memory card, or a ROM.

In addition, the scope of the present invention includes not only a case where the functions in the previous embodiment can be performed when program code is read and executed by the computer, but also a case where, according to an instruction in the program code, an OS (Operating System) running on the computer, etc., performs one part, or all, of the actual processing required to accomplish the functions included in the above embodiments.

Furthermore, the present invention includes a case where program code, read from a memory medium, is written in a memory that is mounted on a function expansion board inserted into a computer, or a function expansion unit connected to a computer, and in consonance with program code instructions, a CPU mounted on the function expansion board, or the function expansion unit performs one part, or all, of the actual processing in order to implement the functions included in the above described embodiments.

As is described above, the following effects can be obtained. Of the print jobs at a printer, the cancellation of a desired print job can be instructed. And even when one part of the print data for the print job to be canceled have not yet been analyzed, the print job can be canceled.

Except for print data that have already been used for printing, all the print data for a selected print job can be invalidated.

Of the print data for a print job that is to be canceled, especially those data that are stored in the input buffer can be invalidated.

Whether print data that are stored in the input buffer are those for a print job to be selected can be easily determined.

Print data in the input buffer can be easily invalidated.

Even during the analyzation of the print data for a selected print job, the print data can be invalidated.

A print job transmitted to the printer can be identified without the print data being analyzed.

Whether the contents of a received job packet are print control data or print data can be determined by examining only the identification information.

A selected print job can be controlled from outside the printer.

The acquisition or the setup of print control data for a selected print job, or the cancellation of a selected print job can be requested.

Print control data for a print job can be externally notified.

A control request can be entered even while a job packet is being input, and the acquisition or setup of the print control data, or the cancellation of a print job, can be performed in real time.

A predetermined print job in the printer can be canceled in accordance with a specific condition, without cancellation of the print job being instructed.

A current or succeeding print job that is to be printed can be specified and canceled.

The printer can receive directly from the outside an instruction for the cancellation of a print job.

The printer can receive directly from the outside an instruction for the cancellation of a specific print job.

The same effects can be provided for the printing system, the printing control method, the recording medium on which is stored a control program for controlling the printer, and the transmission device for transmitting a control program for controlling the printer.

What is claimed is:

1. A print control apparatus which communicates with a host computer, comprising:
    interpreter means for interpreting print data stored in a storage area;
    input means for inputting a print job including print data divided into a plurality of job packets each of which is provided with header information;
    preprocessor means for storing the print data included in each of the plurality of job packets of the print job input by said input means in the storage area;
    manager means for managing print job identification information that identifies the print job, in correspondence to the print data stored in the storage area; and
    invalidation means for, in response to a cancel instruction to cancel a designated print job, invalidating the print data that corresponds to the print job identification information managed by said manager means for the designated print job, wherein with respect to job packets which are being input by said input means, said invalidation means invalidates the print data of the job packets based on the header information provided for the packets without storing the print data in the storage area;
    wherein said preprocessor means divides the print data of a print job into a plurality of blocks via said input means, provides the plurality of blocks with respectively IDs and stores the plurality of blocks of print data in correspondence to the respective IDs in the storage area, and wherein in response to the cancel instruction to cancel a print job designating an ID, said invalidation means invalidates the print data of a block that corresponds to the designated ID.

2. The print control apparatus according to claim 1, further comprising discrimination means for discriminating whether the job packets which are being input correspond to the print job identification information for a print job to be canceled, wherein said invalidation means invalidates the print data of the job packets based on a discrimination made by said discrimination means.

3. A control method for a print control apparatus which communicates with a host computer, said method comprising the steps of:
    inputting a print job including print data divided into a plurality of job packets each of which is provided with header information;
    storing the print data included in each of the plurality of job packets of the print job input in said input step in a storage area;
    interpreting print data stored in the storage area;
    managing print job identification information that identifies the print job, in correspondence to the print data stored in the storage area; and
    invalidating, in response to a cancel instruction to cancel a designated print job, the print data that corresponds to the print job identification information managed in said managing step for the designated print job from among the print data stored in the storage area, wherein with respect to job packets which are being input in said input step, the print data of the job packets based on the header information provided for the packets is invalidated without storing the print data in the storage areas;
    wherein in said managing step the print data of a print job is divided into a plurality of blocks, the plurality of blocks is provided with respective IDs, and the plurality of blocks of print data is stored in correspondence to the respective IDs in the storage area, and wherein in response to the cancel instruction to cancel a print job designating an ID, the print data of a block that corresponds to the designated ID is invalidated in said invalidating step.

4. The control method according to claim 3, further comprising discriminating whether the job packets which are being input correspond to the print job identification information for a print job to be canceled, wherein the print data of the job packets is invalidated based on a discrimination made in said discrimination step.

5. A print control apparatus which communicates with a host computer, comprising:
   an input unit adapted to input a print job from the host computer, wherein the print job includes print data divided into a plurality of job packets each of which is provided with header information;
   a preprocessor adapted to store the print data included in each of the plurality of job packets of the print job in a storage area;
   an interpreter adapted to interpret the print data stored in the storage area; and
   an invalidator adapted to invalidate the print data in response to a cancel instruction to cancel a print job, wherein with respect to job packets which are being input by said input unit, said invalidator invalidates the print data of the plurality of job packet based on the header information provided for the packets.

6. A print control apparatus according to claim 5, further comprising a manager that manages print job identification information that identifies the print job, wherein said invalidator, in response to a cancel instruction to cancel a designated print job, invalidates the print data that corresponds to the print job identification information managed by said manager for the designated print job.

7. A print control apparatus according to claim 5, wherein said invalidator invalidates the print data of the plurality of job packets based on the header information provided for the packets without storing the print data in the storage area.

8. A print control apparatus according to claim 5, wherein the cancel instruction is issued by the host computer.

9. A method for print control of a print job communicated from a host computer, comprising:
   inputting a print job from the host computer, wherein the print job includes print data divided into a plurality of job packets each of which is provided with header information;
   storing the print data included in each of the plurality of job packets of the print job in a storage area;
   interpreting the print data stored in the storage area; and
   invalidating the print data in response to a cancel instruction to cancel a print job, wherein with respect to job packets which are being input by said inputting step, the print data of the plurality of job packets is invalidated based on the header information provided for the packets.

10. A method according to claim 9, further comprising the step of managing print job identification information that identifies the print job, wherein in said invalidating step, in response to a cancel instruction to cancel a designated print job, the print data that corresponds to the print job identification information for the designated print job is invalidated.

11. A method according to claim 9, wherein in said invalidating step, the print data of the plurality of job packets is invalidated based on the header information provided for the packets without storing the print data in the storage area.

12. A method according to claim 9, wherein the cancel instruction is issued by the host computer.

* * * * *

UNITED STATES PATENT AND TRADEMARK OFFICE
CERTIFICATE OF CORRECTION

PATENT NO. : 6,963,416 B2  Page 1 of 1
DATED : November 8, 2005
INVENTOR(S) : Naoki Tuchitoi et al.

It is certified that error appears in the above-identified patent and that said Letters Patent is hereby corrected as shown below:

Title page,
Item [30], Foreign Application Priority Data, "Feb 19, 1998" should read -- Feb. 17, 1998 --.

Drawings,
Figure 5, step S411, "TRANSIT" should read -- TRANSMIT --; and
Figure 33, step S3302, "IN BODY" should read -- IN BODY OF --.

Column 8,
Line 39, "fir" should read -- for --.

Column 9,
Line 66, "th" should read -- the --.

Column 17,
Line 51, "0x101d:" should read -- 0x010d:--.

Column 28,
Line 20, "tively" should read -- tive --.

Column 29,
Line 19, "packet" should read -- packets --.

Signed and Sealed this

Twenty-fifth Day of April, 2006

JON W. DUDAS
*Director of the United States Patent and Trademark Office*